United States Patent
Fullmer et al.

(10) Patent No.: US 12,150,590 B2
(45) Date of Patent: Nov. 26, 2024

(54) GRIDDLE COOKING STATION WITH HOOD AND METHOD THEREOF

(71) Applicant: North Atlantic Imports, LLC, Logan, UT (US)

(72) Inventors: Tyler J. Fullmer, Smithfield, UT (US); Mauricio J. Escobedo, Logan, UT (US); Michael R. Giebel, Joplin, MO (US); Paul J. Simon, Elizabethtown, KY (US)

(73) Assignee: North Atlantic Imports, LLC, Logan, UT (US)

( * ) Notice: Subject to any disclaimer, the term of this patent is extended or adjusted under 35 U.S.C. 154(b) by 348 days.

(21) Appl. No.: 17/227,219

(22) Filed: Apr. 9, 2021

(65) Prior Publication Data

US 2021/0315416 A1    Oct. 14, 2021

Related U.S. Application Data

(60) Provisional application No. 63/007,750, filed on Apr. 9, 2020.

(51) Int. Cl.
| | |
|---|---|
| A47J 36/06 | (2006.01) |
| A47J 37/06 | (2006.01) |
| A47J 37/07 | (2006.01) |
| F24C 7/06 | (2006.01) |
| F24C 15/10 | (2006.01) |

(52) U.S. Cl.
CPC ....... *A47J 37/0682* (2013.01); *A47J 37/0676* (2013.01); *A47J 37/0709* (2013.01); *A47J 37/0713* (2013.01); *A47J 37/0786* (2013.01); *F24C 7/067* (2013.01); *F24C 15/103* (2013.01); *F24C 15/107* (2013.01)

(58) Field of Classification Search
None
See application file for complete search history.

(56) References Cited

U.S. PATENT DOCUMENTS

| | | | |
|---|---|---|---|
| 2,107,346 A | 2/1938 | Skjerven | |
| 3,605,718 A * | 9/1971 | Winters | A47J 37/00 |
| | | | 126/25 |
| 4,649,559 A * | 3/1987 | Beller | E05D 11/10 |
| | | | 16/332 |
| 5,775,535 A * | 7/1998 | Vercellone et al. | B65D 43/00 |
| | | | 220/318 |
| 6,131,505 A | 10/2000 | Lin | |
| 8,286,548 B2 * | 10/2012 | Krishnan et al. | A47J 37/06 |
| | | | 99/378 |
| D825,990 S | 8/2018 | Colston et al. | |
| 10,105,007 B2 | 10/2018 | Colston et al. | |
| 10,159,378 B1 * | 12/2018 | Orban et al. | A47J 36/12 |
| | | | 248/205.1 |
| D839,047 S | 1/2019 | Colston et al. | |
| 10,327,588 B2 | 6/2019 | Dahle et al. | |

(Continued)

*Primary Examiner* — Dana Ross
*Assistant Examiner* — Kevin Guanhua Wen
(74) *Attorney, Agent, or Firm* — David L. Stott

(57) ABSTRACT

Embodiments of a cooking station having a main body and a griddle with a hood pivotably coupled to the griddle are provided. The hood is pivotably moveable between closed and fully open positions. Further, the hood is removable from the griddle to be positioned, for example, along a rear side of the main body in a low-profile position such that the hood may be suspended from the griddle with a hook structure.

20 Claims, 14 Drawing Sheets

(56) References Cited

U.S. PATENT DOCUMENTS

| | | |
|---|---|---|
| 10,568,461 B2 | 2/2020 | Colston et al. |
| 10,588,461 B2 | 3/2020 | Dahle |
| 10,660,473 B2 | 5/2020 | Dahle et al. |
| 10,779,682 B2 | 9/2020 | Dahle et al. |
| 10,799,066 B2 | 10/2020 | Rummel et al. |
| 10,888,193 B2 | 1/2021 | Dahle et al. |
| 2005/0229917 A1* | 10/2005 | Profitt et al. .............. F24B 3/00 126/25 |
| 2007/0175467 A1 | 8/2007 | Liu |
| 2011/0271947 A1 | 11/2011 | Nilssen, II |
| 2017/0238758 A1 | 8/2017 | Rummel et al. |
| 2017/0332839 A1* | 11/2017 | Dahle et al. ............ A47J 37/06 37/682 |
| 2018/0180294 A1* | 6/2018 | Breneman et al. ..... F24C 15/10 15/107 |
| 2020/0008615 A1 | 1/2020 | Dahle et al. |
| 2020/0008619 A1* | 1/2020 | Carrion et al. ......... A47J 37/07 37/763 |

* cited by examiner

GRIDDLE COOKING STATION WITH HOOD AND METHOD THEREOF

CROSS-REFERENCE TO RELATED APPLICATIONS

This application claims the benefit of U.S. Provisional Application No. 63/007,750, filed Apr. 9, 2020, the disclosure of which is hereby incorporated by reference herein in its entirety.

TECHNICAL FIELD

The present invention relates generally to cooking stations and, more specifically, the present invention relates to a hood for a griddle type cooking station.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

Hoods as a feature over portable grills, as opposed to outdoor portable griddle type cooking stations, are common and helpful for accelerating the heating of the food on the grill. Hoods also assist in protecting the grill from the outdoor elements when the grill is not being used. One problem with hoods for portable grills is the large forces placed on an open hood during windy conditions, sometimes resulting in the portable grill toppling over, which especially makes for dangerous conditions while cooking food on the portable grill.

BRIEF SUMMARY OF THE INVENTION

The present invention is directed to various embodiments of an outdoor cooking station. In one embodiment, the outdoor cooking station includes a main body, a griddle and a hood. The main body extends to define a front side, a rear side, a left side and a right side each extending between a lower end and an upper portion, the upper portion of the main body extending to define a heating chamber. The griddle is configured to be supported by the upper portion of the main body, the griddle extending to define an upper side with a cooking surface and a splash guard, the splash guard extending upward from the cooking surface of the griddle. The hood is sized and configured to be pivotably coupled to the splash guard, the hood having a hook structure fixed thereto. The hood is configured to be pivotably moveable between a closed position and an open position relative to the griddle such that, upon the hood being in the open position, the hood is removable from the griddle and positionable to hang on the splash guard with the hook structure.

In another embodiment, the splash guard extends to define a first side splash guard and a second side splash guard with a rear side splash guard extending between ends of the first side splash guard and the second side splash guard. In a further embodiment, the first side splash guard includes a first pin extending therefrom and the second side splash guard includes a second pin extending therefrom, the first pin and the second pin sized and configured to facilitate pivoting the hood therearound. In another further embodiment, the hook structure extending from the hood is sized and configured to engage a top edge of the rear side splash guard.

In another embodiment, the hook structure extends from an underside surface of the hood. In another embodiment, the hook structure includes a first hook and a second hook, the first and second hooks being spaced from each other and extending from an underside surface of the hood.

In another embodiment, the hood pivotably rotates about a pivot axis defined by first and second pins extending from opposite sides of the griddle. In a further embodiment, the hood defines first and second notches in opposite side walls of the hood, the first and second notches sized and configured to hold the hood on the respective first and second pins extending from the griddle. In another embodiment, the splash guard extends upward from the cooking surface of the griddle such that the splash guard defines a first side splash guard, a second side splash guard, a rear side splash guard and a front side splash guard such that the splash guard continuously extends to surround the griddle.

In another embodiment, upon the hood being removed from the griddle, the hood is positionable along the rear side of the main body in a low-profile position. In a further embodiment, the hook structure of the hood is configured to suspend the hood in the low-profile position. In another embodiment, the griddle defines first and second slot structures therein, the first and second slot structures sized and configured to receive respective first and second pins coupled to the hood such that the hood is pivotable about the pins to move between the open position and the closed position. In still another embodiment, the heating chamber is heated with one or more gas burners.

In accordance with another embodiment of the present invention, a method for multi-positioning a hood of an outdoor cooking station is provided. The method includes the steps of: providing a main body of the outdoor cooking station with a griddle positioned on an upper portion of the main body; pivoting the hood over pins extending outward relative to the griddle between a closed position and a fully open position so as to pivot the hood about an axis defined by the pins; positioning the hood from the fully open position to a forward tilted position; lifting the hood upward from the forward tilted position to remove the hood from the pins extending from the griddle; and positioning the hood along a rear side of the main body by suspending the hood on the griddle with a hook structure.

In another embodiment, the pivoting step includes pivoting the hood between the closed and fully open positions along a single pivot axis defined by the pins. In still another embodiment, the positioning the hood along the rear side of the main body step includes hanging the hood on a splash guard of the griddle with the hook structure. In another embodiment, the lifting the hood step includes removing the hood from the pins, upon the hood being in the forward tilted position, so that the pins slide along and from notches defined in opposite side walls of the hood. In yet another embodiment, the positioning the hood along the rear side step includes positioning the hood in a low-profile position with the hook structure extending from a front underside of the hood such that the hook structure engages a rear splash guard of the griddle.

In accordance with another embodiment of the present invention, a cooking station that includes a main body, a griddle, and a hood is provided. In one embodiment, the main body extends to define a front side, a rear side, a left side and a right side each extending between a lower end and an upper portion, the upper portion of the main body including a heating element. The griddle is configured to be supported by the main body and is removably coupled to the main body. The griddle also extends to define an upper side with a cooking surface and a splash guard, the splash guard extending upward from the cooking surface of the griddle. The hood is sized and configured to be pivotably coupled adjacent to the splash guard such that the hood is pivotably moveable between a closed position and a fully open position relative to the griddle. With this arrangement, upon the hood being pivoted forward from the fully open position to a tilted position, the hood is removable from the griddle.

In another embodiment, the heating element includes an electrical resistive heating element. In another embodiment, the heating element includes one or more gas burners. In still another embodiment, the griddle includes a first slot and a second slot defined in the griddle, the first and second slots sized and configured to receive respective first and second hinge pins associated with the hood, the hood pivotable about an axis defined by the first and second hinge pins so as to be movable between the closed position and the fully open position. In still another embodiment, the hood is removable from the griddle upon the hood being in the closed position.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
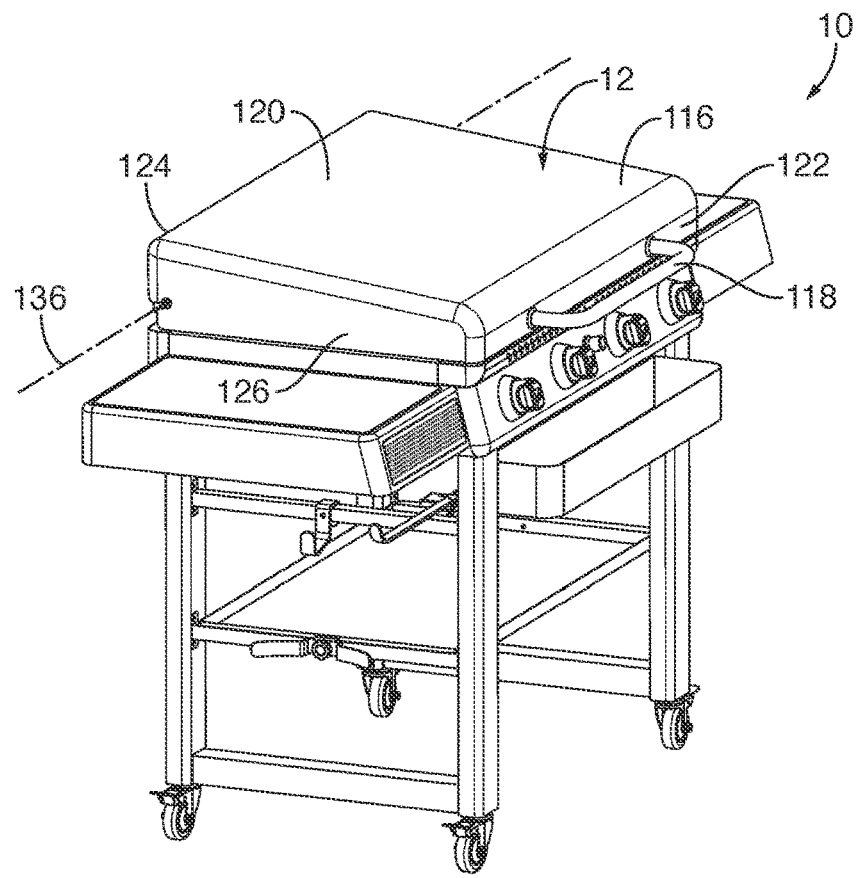
FIG. 1 is a perspective view of a cooking station with a hood in a closed position, according to an embodiment of the present invention.
Figure 2:
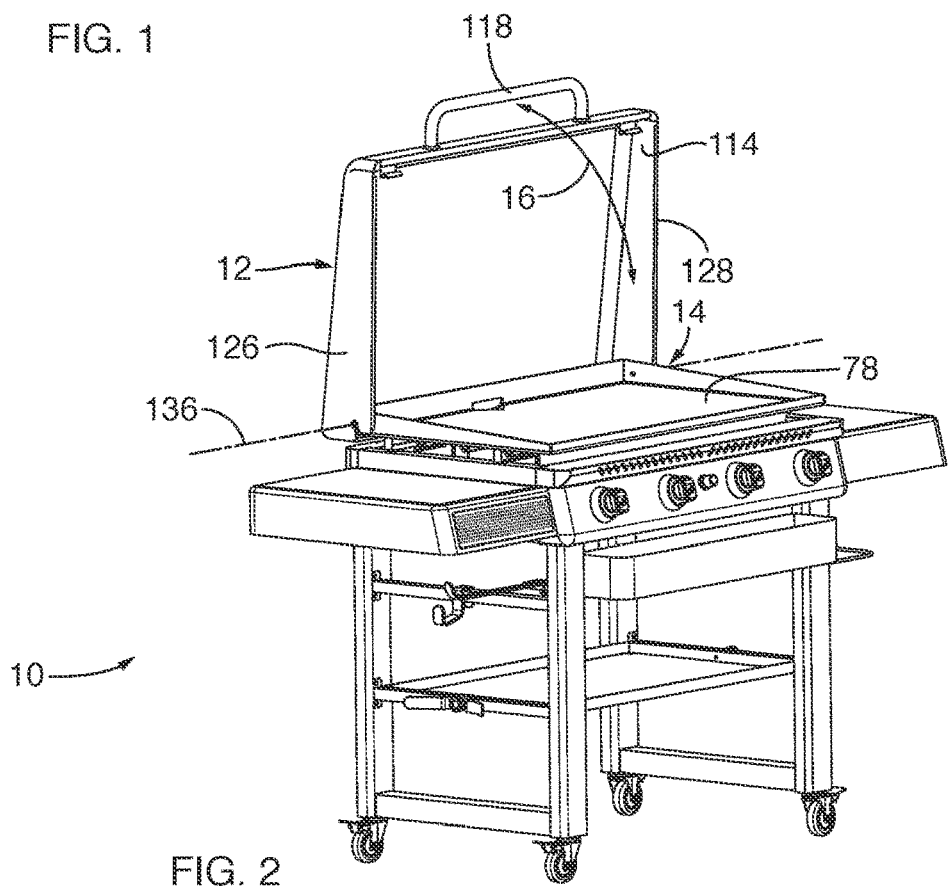
FIG. 2 is a perspective view of the cooking station with the hood in a fully open position, depicting the hood being pivotably coupled to a griddle, according to another embodiment of the present invention.

Referring to FIGS. 1 and 2, a cooking station 10 with a hood 12 moveable to various positions relative to a griddle 14 positioned on the cooking station 10 is provided. Such cooking station 10 is made for outdoor use and may be sized and configured to be readily moveable such that the cooking station 10 is portable. Further, the cooking station 10 may be of the type that is gas heated with propane or natural gas, but may also be employed with alternative fuel sources, such as charcoal, wood chips or any other suitable fuel source. In one embodiment, the cooking station 10 may include the hood 12 pivotably coupled to the cooking station 10 such that the hood 12 may pivot or rotate, as shown by arrow 16, between a closed position and a fully open position, as well as various other open positions tilted or pivoted forward relative to the fully open position. In a further embodiment, such hood 12 may be pivotably coupled to the griddle 14. Further, the hood 12 may be readily removable from the griddle 14 or cooking station 10. In another embodiment, the hood 12 may be removed and suspended on the griddle 14 of the cooking station 10 (see FIG. 6). In this manner, the hood 12 may be oriented in various positions relative to the griddle 14 as desired by the user.

Figure 3:
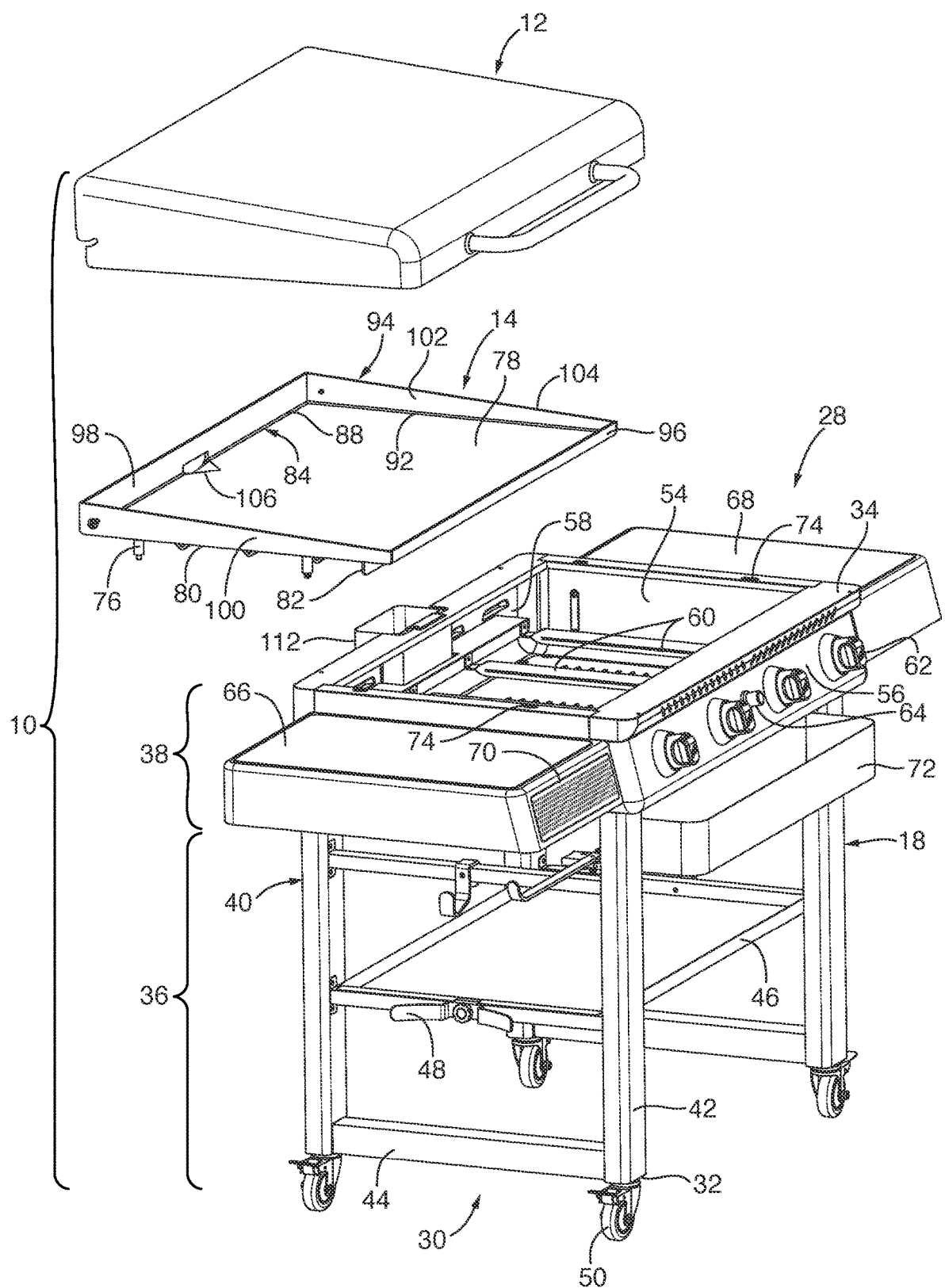
FIG. 3 is an exploded perspective view of the cooking station, according to another embodiment of the present invention.
Figure 4:
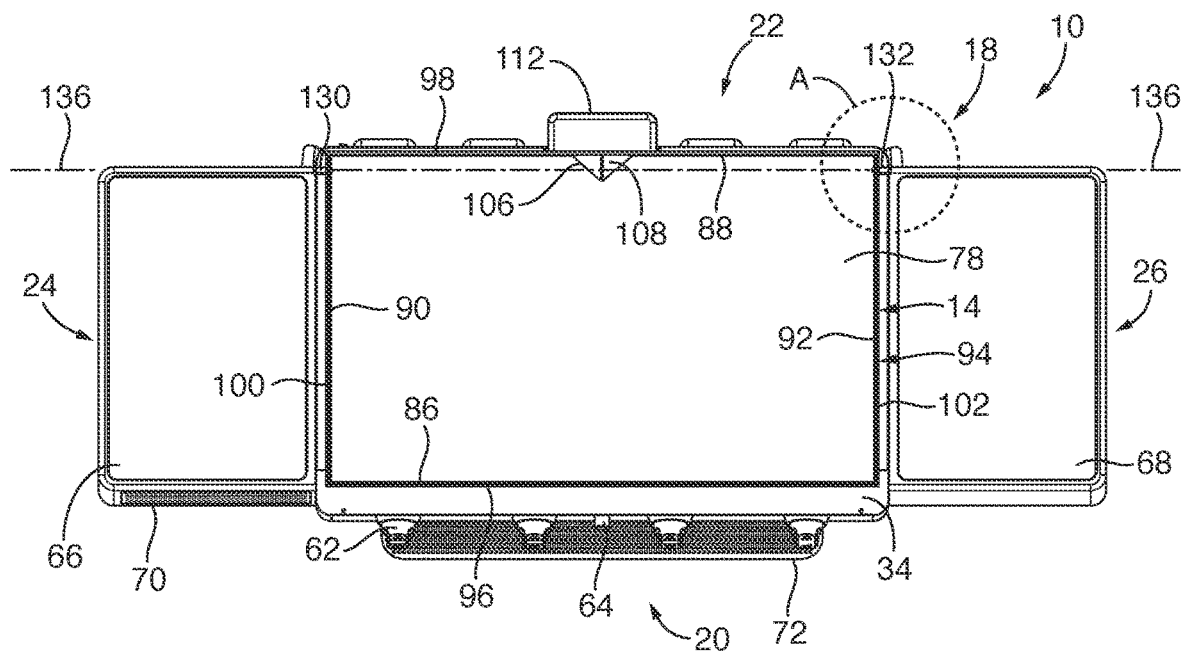
FIG. 4 is a top view of the cooking station, depicting the cooking station without the hood, according to another embodiment of the present invention.

With reference to FIGS. 3 and 4, the cooking station 10 may include a main body 18 extending to define a front side 20, a rear side 22, a first side 24, a second side 26, an upper side 28 and a bottom side 30. The front side 20 may be the side a user may stand for cooking food and operating the controls of the cooking station 10. The rear side 22 may be opposite the front side 20 of the cooking station 10. The first side 24 may be opposite the second side 26, and the upper side 28 may be opposite the bottom side 30 of the cooking station 10. The main body 18 of the cooking station 10 may extend between a lower end 32 and an upper end 34 with a lower portion 36 and an upper portion 38 therebetween. Further, the main body 18 may include a frame structure 40 to which various housing or panel structures may be attached. For example, the lower portion 36 of the frame structure 40 may include legs 42 extending from the upper portion 38. In some embodiments, the front side 20 of the lower portion 36 may include doors or drawers to provide cabinet like characteristics in the cooking station 10 and one or more panels along the first and second sides 24, 26 of the lower portion 36 of the main body 18. The lower portion 36 may include one or more cross-members 44 extending between the legs 42 for stability of the cooking station 10. Further, the lower portion 36 may include a panel structure or shelf 46 held by the one or more cross-members 44. Further, the lower portion 36 may include supporting structure 48 for supporting a propane tank (not shown), for example. Further, the legs 42 may include wheels 50, such as caster wheels, coupled to the lower end 32 of the main body 18. In this manner, the cooking station 10 may be readily moveable to a desired location, thereby, providing portability to the cooking station 10 as well as being readily employable for outdoor use at most any desired location.

The upper portion 38 of the main body 18 may include the frame structure 40 with various panels sized and configured to house various components and controls of the cooking station 10. For example, the upper portion 38 of the main body 18 may define a heating chamber 52 with side panels 54, a front panel 56, and a rear panel 58, each extending between the upper end 34 and the lower portion 36 of the main body 18. Further, within the heating chamber 52, the upper portion 38 may include one or more heating elements, such as gas burners 60, extending between the front panel 56 and the rear panel 58. The front panel 56 includes various components and controls positioned and secured therewith such that burner knobs 62 may be positioned along an exterior side of the front panel 56. The gas burners 60 may receive fuel by rotating the burner knobs 62 from an off-position to an on-position. Such burner knobs 62 may be coupled to the front panel 56 of the main body 18 and may each be aligned with a corresponding gas burner 60. Each of the burner knobs 62 may include the appropriate valves and components associated therewith configured to control gas being supplied to the gas burners 60, as known to one of ordinary skill in the art. Further, the main body 18 may also include an igniter switch 64. The igniter switch 64 may be positioned on the front panel 56 sized and configured to ignite the particular gas burners 60 corresponding with any one of the given burner knobs 62 rotated to the on-position. The gas burners 60 may be fueled with gas, such as propane gas, with a propane gas tank (not shown) or fueled with natural gas, which may be coupled to the gas burners 60 via various components, such as a gas line and connection valve or the like. Although only some of the primary components for operating the cooking station 10 are described herein, the remaining components that may be needed for proper functioning of the cooking station may be incorporated herewith and into the cooking station 10 as known by one of ordinary skill in the art.

Further, the main body 18 of the cooking station 10 may include a first side shelf 66 and a second side shelf 68. The first and second side shelves 66, 68 may be coupled to respective first and second sides 24, 26 of the main body 18 adjacent to the upper end 34 of the main body 18. In some embodiments, the first and second side shelves 66, 68 may be substantially level with the upper end 34 of the main body 18. In other embodiments, the first and second side shelves 66, 68 may be positioned lower than level with the upper end 34 of the main body 18. One or both of the first and second side shelves 66, 68 may include coupling structure 70, such as a magnetic sheet or bar or various hooks, associated therewith. For example, the coupling structure 70 may be positioned along one or more sides of one of the first and second side shelves 66, 68. In addition, in one embodiment, the front side 20 of the cooking station 10 may include a bin 72 positioned below the front panel 56 and burner knobs 62, the bin sized and configured to hold various cooking components and/or utensils.

Figure 5:
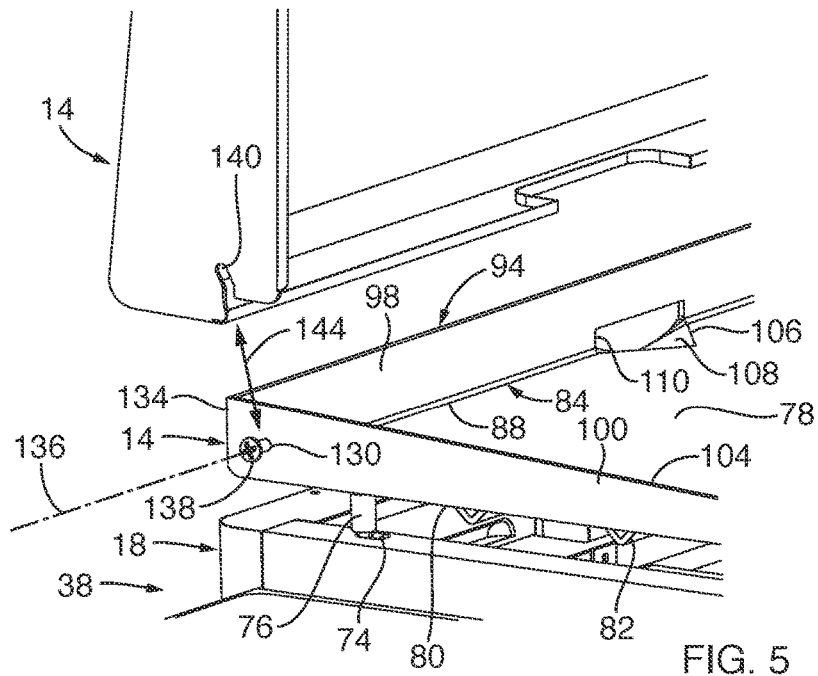
FIG. 5 is an enlarged view of a portion of the cooking station, depicting another hinge pin of the griddle with the hood adjacently positioned in a removed position, according to another embodiment of the present invention.

Now with reference to FIGS. 3 and 5, the upper portion 38 of the main body 18 may be sized and configured to support the griddle 14. In one embodiment, the upper portion 38 of the main body 18 may include apertures 74, such as two apertures along first and second sides 24, 26 of the upper end 34 of the main body 18, sized and configured to receive griddle legs 76 of the griddle 14. As such, the griddle 14 may include appropriately spaced griddle legs 76 extending from the griddle 14 to correspond with the apertures 74 of the main body 18. Some or each of the apertures 74 of the main body 18 may include a locking structure to provide additional stability for capturing the griddle legs 76 of the griddle 14 as well as additional stability to the hood 12 coupled to the griddle 14. Such locking structure for the griddle legs 76 of the griddle 14 is disclosed in commonly owned U.S. Provisional Application No. 62/975,143, the disclosure of which is incorporated herewith in its entirety.

Now with reference to FIGS. 3, 4 and 5, the griddle 14 may extend to define a flat plate structure with oppositely facing surfaces: a flat cooking surface 78 and an underside surface 80. The underside surface 80 of the griddle 14 may include multiple elongated structures or ribs 82 sized and configured to be coupled to the underside surface 80 of the griddle 14. Such elongated ribs 82 may act to block heat from bellowing outward from the front side 20 of the griddle 14 and/or assist the plate structure of the griddle 14 to resist high temperature warping of the plate structure. Further, as previously set forth, the underside surface 80 of the griddle 14 may include the four griddle legs 76 extending downward or away from the underside surface 80 of the griddle 14. Such griddle legs 76 may be fixed and positioned adjacent opposite first and second sides 24, 26 of the griddle 14 and may be appropriately sized and spaced relative to each other to support the griddle 14.

The flat cooking surface 78 of the griddle 14 extends to a periphery 84 or cooking surface periphery such that the periphery 84 and the cooking surface 78 may define a rectangular or square shape. As such, the cooking surface 78 may extend to front and rear peripheries 86, 88 and first and second side peripheries 90, 92 or lengths thereof, each periphery length extending along the periphery 84 of the cooking surface 78. The griddle 14 may include a splash guard 94 extending to define one or more upstanding side walls. In one embodiment, the splash guard 94 may extend upward from the periphery 84 of the cooking surface 78 so as to define a front splash guard 96, a rear splash guard 98, a first splash guard 100 and a second splash guard 102 each of which may be interconnected such that the splash guard 94 extends continuously along the periphery 84 of the cooking surface 78. The front splash guard 96 may directly extend upward from the front periphery 86, and the rear splash guard 98 may directly extend upward from the rear periphery 88. Similarly, the first splash guard 96 may directly extend upward from the first side periphery 90 and the second splash guard 102 may directly extend upward from the second side periphery 92. In one embodiment, the front splash guard 96 may be shorter in height than the rear splash guard 98 and the first and second splash guards 100, 102 may taper in height between the rear splash guard 98 to the front splash guard 96. In another embodiment, the splash guard 94 may extend with a top edge 104 that may extend continuously along each of the front, rear, first and second splash guards 96, 98, 100, 102. In another embodiment, the splash guard 94 may extend partially along the periphery 84 of the cooking surface 78. In another embodiment, the splash guard 94 may extend directly upward from the first and second side peripheries 90, 92 and the rear periphery 88.

The griddle 14 may also extend to define a trough 106 sized and configured to drain grease and unwanted food byproduct from the cooking surface 78 of the griddle 14. In one embodiment, the trough 106 may be positioned adjacent the rear periphery 88 and may define a slope 108 to assist in draining the grease through an opening 110 defined in the griddle 14. Such opening 110 may be at least partially defined in the rear splash guard 98 adjacent the trough 106. Further, in another embodiment, the trough 106 and opening 110 defined in the griddle 14 may be positioned centrally adjacent the rear periphery 88. In another embodiment, the trough 106 and opening 110 defined in the griddle 14 may be positioned along and adjacent at least one of the first side periphery 90 and the second side periphery 92. In another embodiment, the trough 106 and opening 110 defined in the griddle 14 may be positioned along and adjacent two peripheral sides, such as the rear and first side peripheries 88, 90 or the rear and second side peripheries 88, 92. In some embodiments, there may be two troughs 106 each associated with its own opening 110 adjacent two different peripheral sides of the cooking surface 78. In another embodiment, the trough 106 may be elongated to extend along the front periphery 86. Each of the embodiments of the trough 106 may be associated with a removable grease container 112 that may be positioned below the opening 110 and trough 106. Similar grease management systems for a griddle are disclosed in commonly owned U.S. Non-Provisional patent application Ser. Nos. 16/448,639 and 16/448,746, the disclosures of which are incorporated herewith in their entirety.

Figure 6:
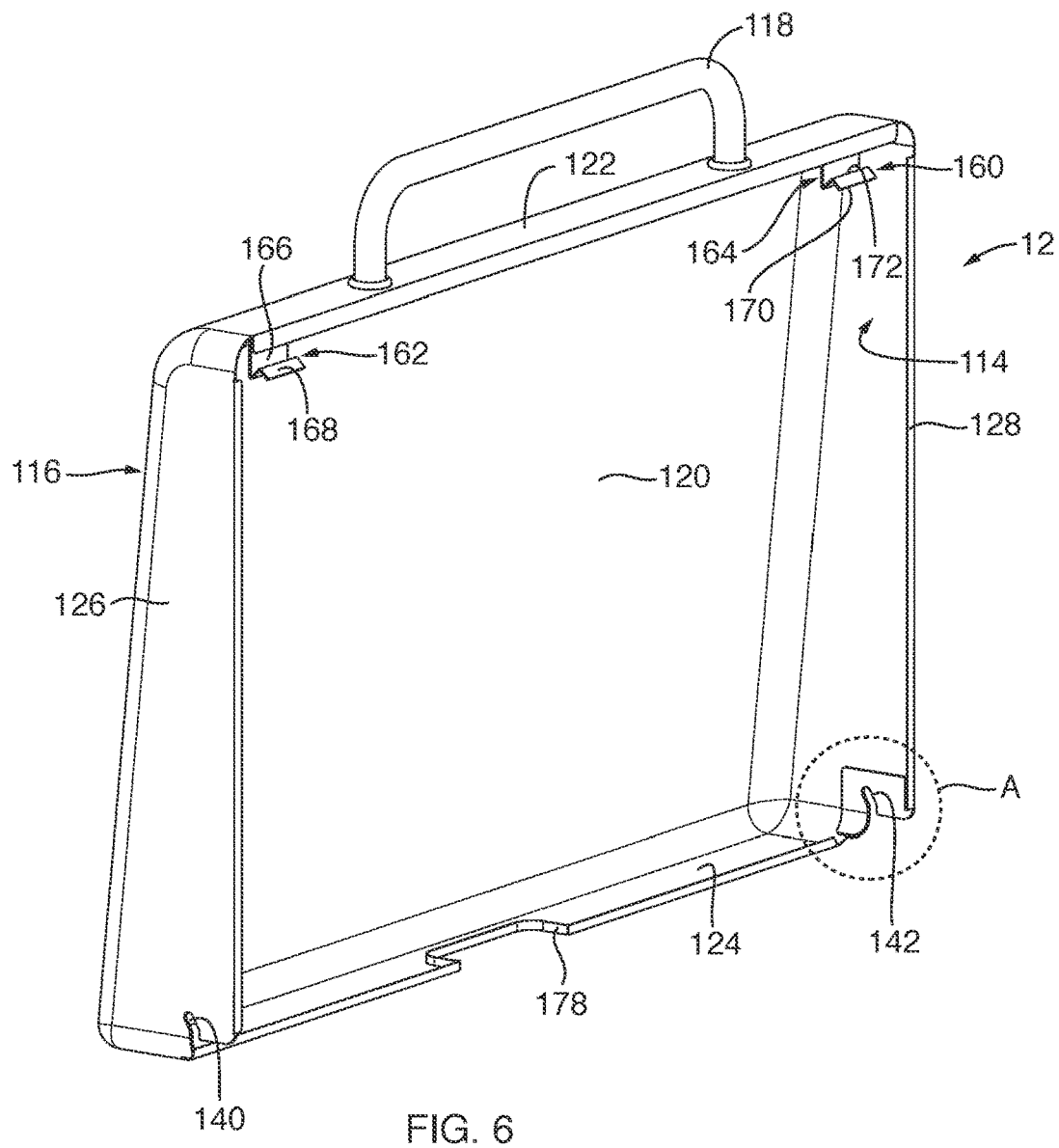
FIG. 6 is a perspective view of the hood, according to another embodiment of the present invention.

With reference to FIGS. 1 and 2 and in conjunction with FIG. 6, as previously set forth, the griddle 14 may be covered by the hood 12. The hood 12 may extend to define an internal surface 114 and an external surface 116. The hood 12 may be pivotably coupled to the griddle 14 so that the hood 12 may remain coupled to the griddle 14 and may be readily moved between a closed position and a fully open position with a handle 118. The handle 118 may extend from the external surface 116 of the hood 12 and may be coupled to the front side 20 of the hood 12. With the hood 12 oriented in the closed position, the hood 12 may include a top hood wall 120 sized and configured to extend over the cooking surface 78 of the griddle 14 with a front hood wall 122, a rear hood wall 124 (see FIG. 6), a first side hood wall 126 and a second side hood wall 128 each extending downward relative to the top hood wall 120. The front and rear hood walls 122, 124 may extend downward from opposite sides of the top hood wall 120 and may extend parallel relative to each other. The first and second side hood walls 126, 128 may extend downward from opposite sides of the top hood wall 120 and may extend parallel relative to each other. The top hood wall 120 may extend with a curvature toward each of the front hood wall 122, the rear hood wall 124, and the first and second side hood walls 126, 128. Further, the top hood wall 120 may be angled so as to slope downward toward the front hood wall 122 such that the front hood wall 122 may be smaller in height than the rear hood wall 124. Further, the first and second side hood walls 126, 128 may taper in height so as to follow the slope of the top hood wall 120. With this arrangement, the hood 12 may be sized so that, upon the hood 12 being in the closed position, the hood 12 may surround the splash guard 94 of the griddle 14. Further, the hood 12 may be pivotably moved between the closed and open positions with the handle 118 that may be coupled to the front hood wall 122.

Figure 4A:
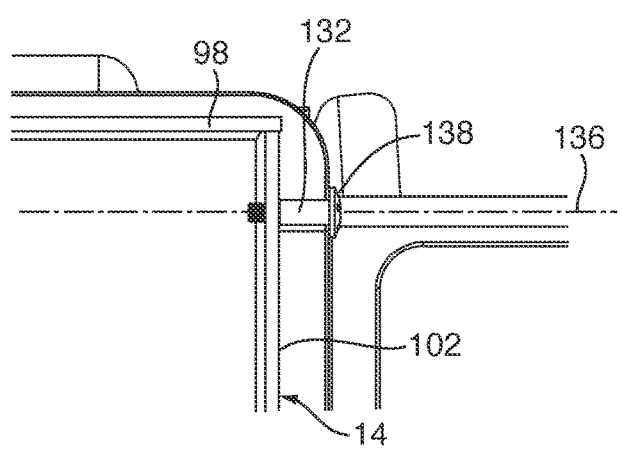
FIG. 4A is an enlarged perspective view of the cooking station taken from region A of FIG. 4, depicting a hinge pin of the griddle, according to another embodiment of the present invention.

Now with reference to FIGS. 4, 4A and 5, in one embodiment, the first and second splash guards 100, 102 of the griddle 14 may include first and second hinge pins 130, 132, respectively, extending therefrom. The first and second hinge pins 130, 132 may be sized and configured to couple to the hood 12 to facilitate pivoting the hood 12 about the first and second hinge pins 130, 132. The first and second hinge pins 130, 132 may extend directly outward from the respective first and second splash guards 100, 102 along a rearward side of the griddle 14 or adjacent to respective corners 134 where the first and second splash guards 100, 102 joins with the rear splash guard 98. The first hinge pin 130 may be aligned with the second hinge pin 132 so as to define an axis 136, which may also be a pivot axis of the hood 12. The first and second hinge pins 130, 132 may extend with a radial external surface sized and configured to be sized and configured to facilitate rotating or pivoting the hood 12 thereover. Further, the first and second hinge pins 130, 132 may each extend outward in a substantially perpendicular manner relative to an external surface of the respective first and second splash guards 100, 102. Furthermore, the first and second hinge pins 130, 132 may each extend outward to a free end that may exhibit a flange 138. The first and second hinge pins 130, 132 may be rotatably coupled to the respective first and second splash guards 100, 102 so as to be screwed thereto or the first and second hinge pins 130, 132 may be fixed to the respective first and second splash guards 100, 102 via welding, for example.

Figure 6A:
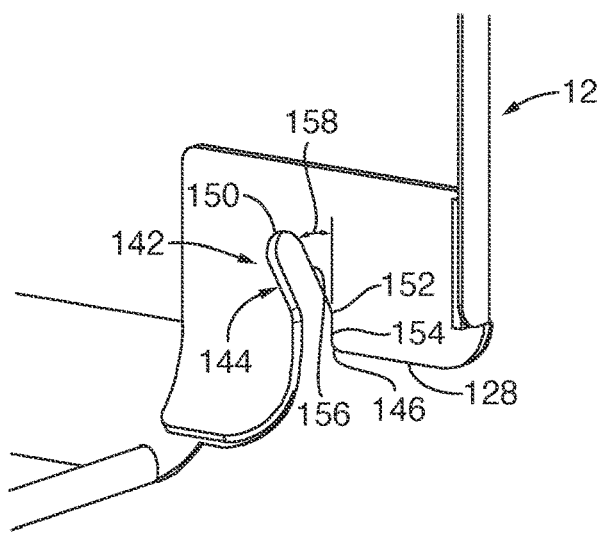
FIG. 6A is an enlarged perspective view of the hood taken from region A of FIG. 6, depicting detail of one of the notches of the hood, according to another embodiment of the present invention.

Now with reference to FIGS. 6 and 6A in conjunction with FIGS. 4A and 5, the first and second hinge pins 130, 132 may be sized and configured to cooperate with first and second notches 140, 142, respectively, defined in the hood 12. For example, the first and second notches 140, 142 may be defined in the first and second side hood walls 126, 128 along a rearward side of the first and second side hood walls 126, 128 and adjacent the rear hood wall 124. Further, the first and second notches may extend through the respective first and second side hood walls 126, 128 so as to extend between the internal and external surfaces 114, 116 of the hood 12. The first and second notches 140, 142 may be mirror images of each other so as to be substantially identical. Further, the first and second notches 140, 142 defined in the hood 12 may each extend with an elongated structure 144 so as to define a path with an open end 146 to receive the respective first and second hinge pins 130, 132, as shown by arrow 148 in FIG. 5. The elongated structure 144 of each of the first and second notches 140, 142 may extend from the open end 146 to a closed end 150 thereof. The closed end 150 may act as a hard stop configured to engage an external surface of the respective one of the first and second hinge pins 130, 132. In one embodiment, the elongated structure 144 of each of the first and second notches 140, 142 may extend with at least one bend 152 therealong. In another embodiment, the elongated structure 144 of each of the first and second notches 140, 142 may extend with a first linear portion 154 and a second linear portion 156 with the at least one bend 152 positioned between the first and second linear portions 154, 156. The second linear portion 156 may extend at an angle 158 relative to the first linear portion 154 such that, upon the hood 14 being oriented in the closed position (FIG. 1), the second linear portion 156 may extend upward at the angle 158 relative to the first linear portion 154. In another embodiment, the elongated structure 144 of each of the first and second notches 140, 142 may be oriented so that the closed end 150 of the elongated structure 144 may rest on the respective first and second hinge pins 130, 132. In another embodiment, the elongated structure 144 of the first and second notches 140, 142 may extend radially therealong so as to exhibit curved portions along the elongated structure 144.

Figure 9:
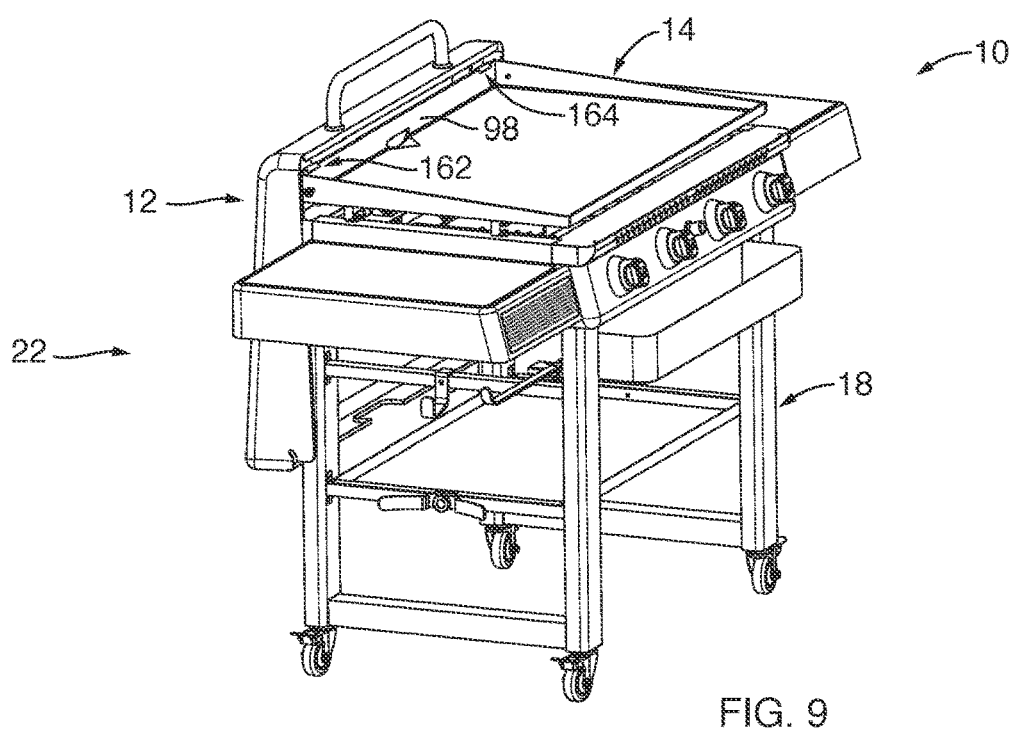
FIG. 9 is a perspective view of the cooking station, depicting the hood hanging on a rear portion of the griddle of the cooking station, according to another embodiment of the present invention.

With reference to FIG. 6, in another embodiment, the hood 12 may include a hook structure 160 sized and configured for suspending the hood 12 from the cooking station 10 (see FIG. 9). For example, the hook structure 160 may extend from the front hood wall 122 of the hood 12. Further, the hook structure 160 may extend from the internal surface 114 of the hood 12. In another embodiment, the hook structure 160 may extend with a first hook 162 and a second hook 164. The first and second hooks 162, 164 may be spaced apart and extend from the internal surface 114 of the front hood wall 122. In another embodiment, the first hook 162 may be substantially similar to the second hook 164. In another embodiment, the first and second hooks 162, 164 may extend from the internal surface 114 of the respective first and second side hood walls 126, 128. The first and second hooks 162, 164 may extend in the form of a tab like structure. For example, with the hood 12 being in an upright orientation (as depicted in FIG. 6), the first and second hooks 162, 164 may include a first extension 166 and a second extension 168. The first extension 166 may extend directly away from the front hood wall 122 so as to extend transverse relative to the front hood wall 122. In another embodiment, the first extension 166 may extend substantially perpendicular relative to the front hood wall 122. The second extension 168 may extend continuously from the first extension 166 and may extend transverse relative to the first extension 166 to a free end 170. The second extension 168 may include a bend 172 along its length such that the bend 172 along the second extension 168 may act as structure for hanging the hood 12 on the cooking station 10. In this manner, the first and second hooks 162, 164 may extend with structure for suspending the hood 12, discussed further detail herein. In another embodiment, the hood 12 may define a notch 178 in the rear hood wall 124 sized and configured to facilitate the hood 12 in bypassing or clearing the grease container 112 upon the hood 12 being moved to or adjacent to the fully open position relative to the griddle 14 (see FIGS. 2 and 7). Such notch 178 may be centrally located in the rear hood wall 124 or located at any predetermined location in the hood, dependent upon the location of the grease container 112.

With reference to FIGS. 1 and 2 in conjunction with FIGS. 4 and 6, as previously set forth, the hood 12 may be pivotably coupled to the griddle 14 with the first and second hinge pins 130, 132 positioned within the respective first and second notches 140, 142 defined in the hood 12. With such pivotable coupling, the hood 12 may be positioned in the closed position and may be pivoted or rotated upward to the fully open position or be pivoted or tilted forward of the fully open position to be in various other open positions. In this manner, the hood 12 of the cooking station 10 may be rotated or pivot about the axis 136 of the first and second hinge pins 130, 132 to any one of the open positions or the closed position while the cooking station 10 is being employed for cooking on the griddle 14 or while the cooking station 10 is in a non-use state, as desired by the user of the cooking station 10. Further, in certain instances, it may be desirable to remove the hood 12, such as in windy or breezy conditions.

Figure 7:
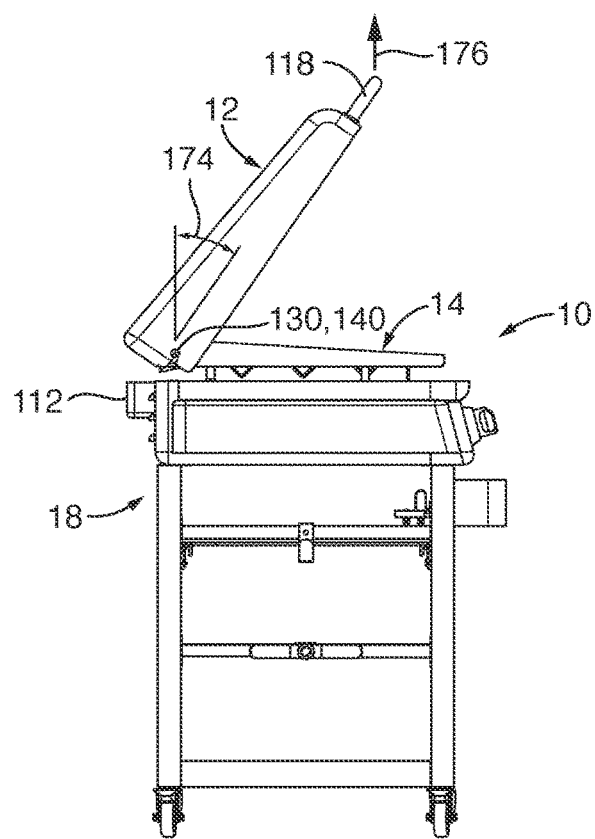
FIG. 7 is a side view of the cooking station, depicting the hood in a forward tilted position from the fully open position depicted in FIG. 2, according to another embodiment of the present invention.
Figure 8:
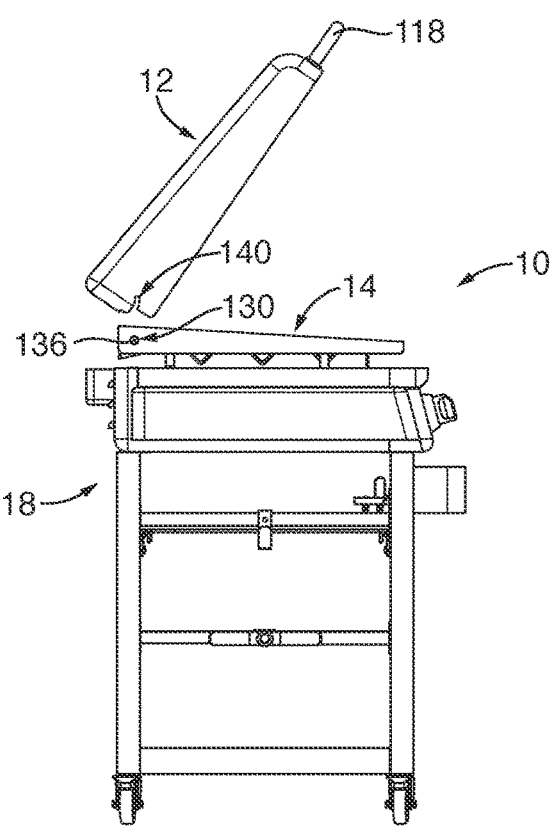
FIG. 8 is a side view of the cooking station, depicting the hood removed from the cooking station of FIG. 7, according to another embodiment of the present invention.

With reference to FIGS. 7 and 8 and in conjunction with FIGS. 4, 5, 6, and 6A, as previously set forth, the hood 12 may be readily removed from the main body 18 of the cooking station 10. For example, the hood 12 may be positioned in a forward tilted or pivoted position, as shown by angle 174, (forward of the fully open position as depicted in FIG. 7) and lifted upward, as shown by arrow 176. In this manner, as depicted in FIG. 8, the hood 12 may be readily removed from the griddle 14 by a user lifting upward on the handle 118 so that the first and second hinge pins 130, 132 move or slide relative to the elongated structure 144 of the respective first and second notches 140, 142. The forward tilted position of the hood 12 orients the second linear portion 156 of the elongated structure 144 in a generally vertical orientation so that the user may readily lift the hood 12 from the first and second hinge pins 130, 132 so that the respective notches are moved upward from the axis 136. Similarly, the hood 12 may be replaced and coupled to the hinge pins 130, 132 by positioning the first and second notches 140, 142 over the respective first and second hinge pins 130, 132 so that such hinge pins slide along the elongated structure 144 of the first and second notches 140, 142 until the closed end 150 of the first and second notches 140, 142 engages the first and second hinge pins 130, 132. The hood 12 may then be pivoted about the first and second hinge pins 130, 132 of the griddle 14, as previously set forth.

With reference to FIGS. 6 and 9, as previously set forth, the hood 12 may be readily removed from the griddle 14. Upon removing the hood 12 from the griddle 14, the hood 12 may be positioned in a low-profile position relative to the cooking station 10, as depicted in FIG. 9. This low-profile position may be helpful in windy conditions that a user may be cooking in with the cooking station 10. In such conditions or, if desired by the user, the hood 12 may be moved to a suspended position along the rear side 22 of the main body 18 so that the first and second hooks 162, 164 of the hood 12 may be disposed to rest over the rear splash guard 98 of the griddle 14. In this manner, the hook structure 160 of the hood 12 may be sized and configured to engage the griddle 14 and employed to hang or suspend the hood 12 over the griddle 14 so that the hood 14 is positioned along the rear side 22 of the main body 18 of the cooking station 10. In another embodiment, the hood 12 may be suspended over another portion of the main body 18 of the cooking station 10. With this arrangement, the hood 12 may be readily suspended on the cooking station 10 as well as readily moved from the suspended position by lifting the hood 12 with the handle 118, which hood 12 may then be readily positioned to be pivotably coupled to the griddle 14, as previously described herein.

Figure 10:
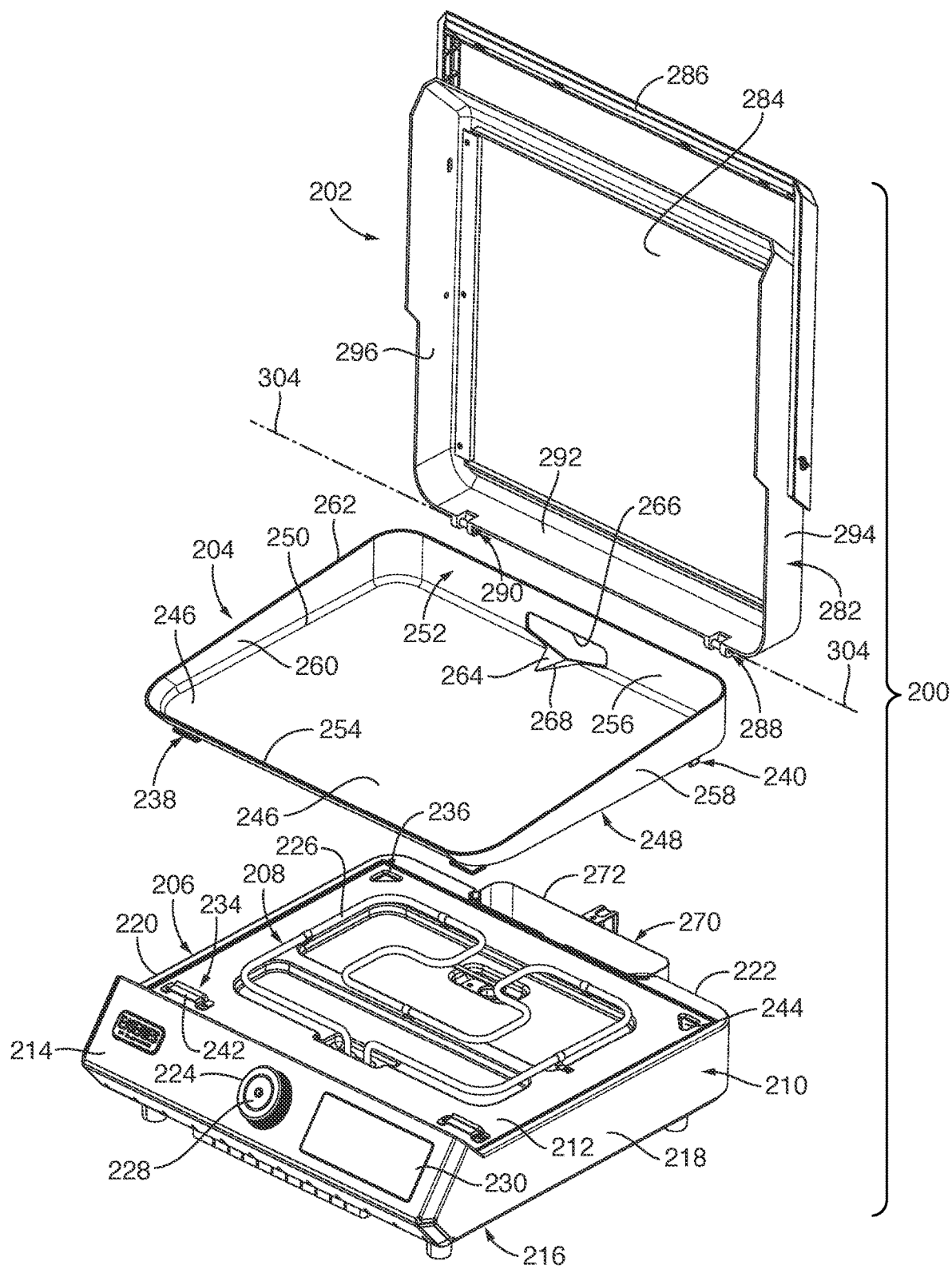
FIG. 10 is an exploded view of another embodiment of a cooking station having a removable hood, depicting the cooking station with a base with an electric heat element and a removable griddle, according to the present invention.
Figure 11:
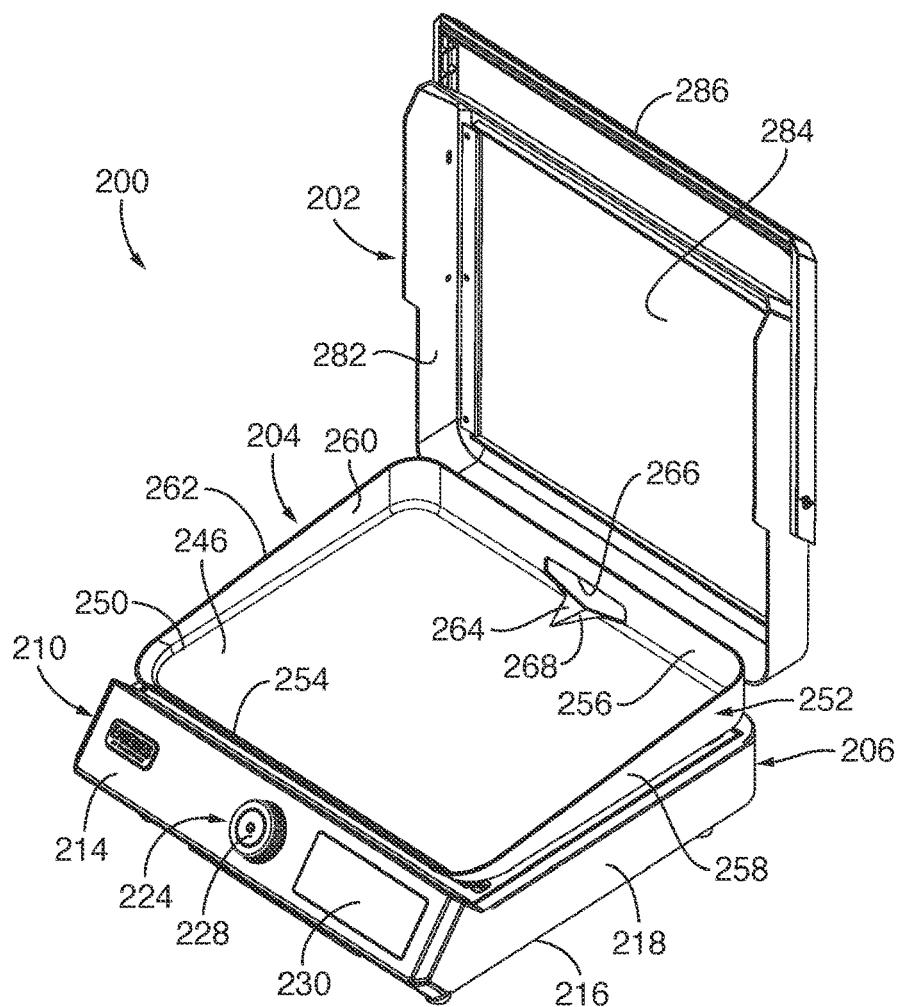
FIG. 11 is a perspective front view of the cooking station with the griddle and hood assembled to the base, depicting the hood in an open position, according to another embodiment of the present invention.
Figure 12:
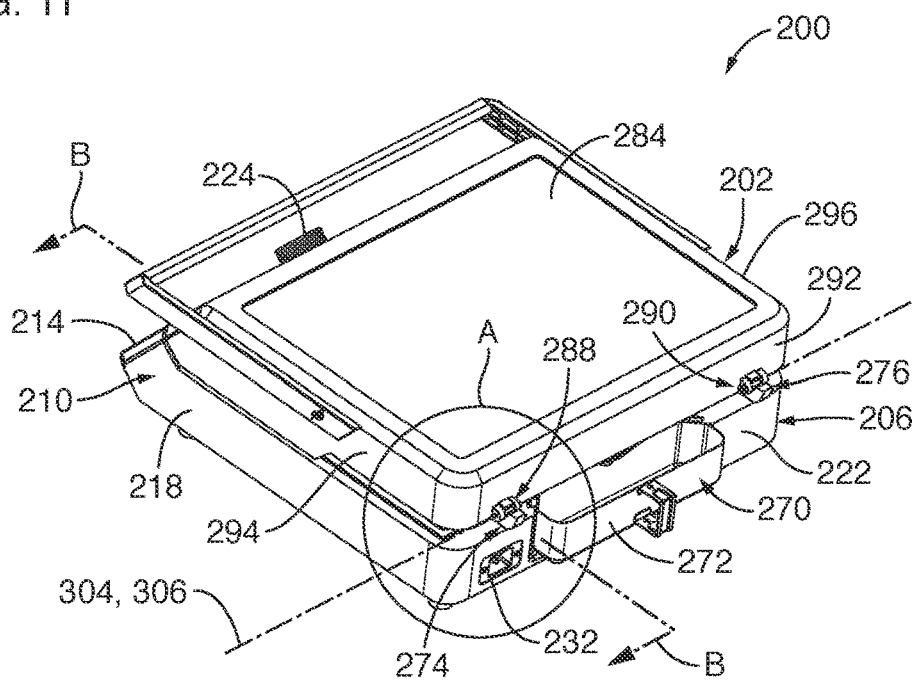
FIG. 12 is a perspective rear view of the cooking station of FIG. 11, depicting the hood in the closed position, according to another embodiment of the present invention.
Figure 12A:
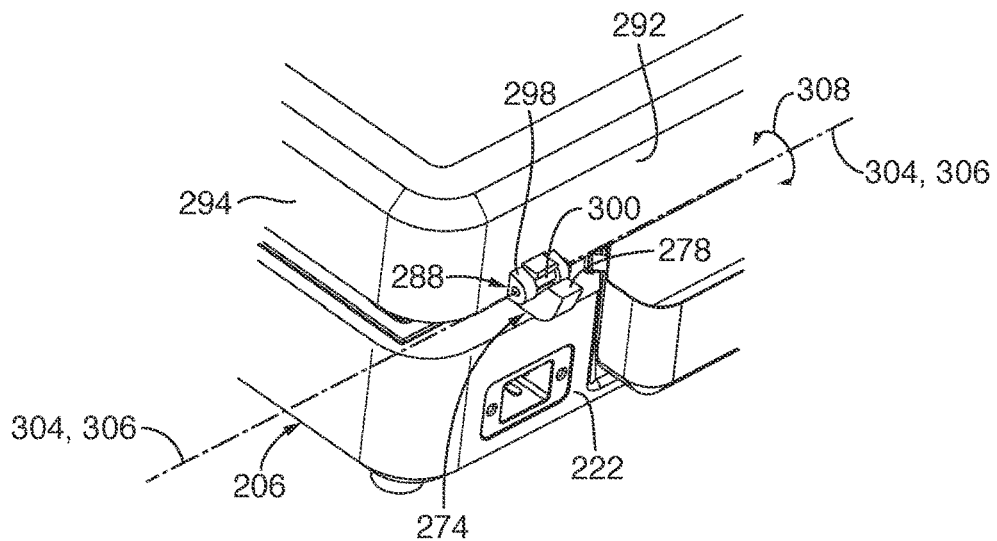
FIG. 12A is an enlarged view of the cooking station taken from region A of FIG. 12, according to another embodiment of the present invention.

Now with reference to FIGS. 10-16, another embodiment of a cooking station 200 with a hood 202 that may be rotatably coupled to a griddle 204 of the cooking station 200 is provided. With reference first to FIGS. 10-12, the cooking station 200 of this embodiment may be an indoor and/or outdoor cooking station since this cooking station 200 may be solely electrically heated. The cooking station 200 may include the griddle 204 and the hood 202 each positionable over a base 206. As set forth, the hood 202 may be rotatably coupled to the griddle 204 such that the hood 202 may be moved between an open position (FIG. 11) and a closed position (FIG. 12). Further, the hood 202 may be readily removable from the griddle 204, discussed further herein. Even further, the griddle 204 may also be removable from the base 206 of the cooking station 200.

The base 206 of the cooking station 200 may be sized and configured to support a heating element 208 as well as the griddle 204. The base 206 may include a housing 210 extending to define an upper side surface 212, a front side panel 214, an underside surface 216, first and second side surfaces 218, 220 and a rear side surface 222. The front side panel 214 of the base 206 may include a rotatable control knob 224 sized and configured for adjusting a desired temperature of the heating element 208, such as an electrical heating element 226 or resistive heating element, as known in the art. The base 206 may also include an on-off switch in the form of a button 228 that may be associated with the control knob 224. Further, the front side panel 214 may include a display 230 that may visually display the desired temperature of the user, controlled by the control knob 224 and displayed on the display 230. The display 230 may also provide an indicator (not shown), in analog or digital form, to identify to the user when the griddle 204 or the heating element 208 has reached or approximately reached the desired temperature. The upper side surface 212 of the base 206 may include the electrical heating element 226 adjacent thereto. The electrical heating element 226 may extend as a single electrical heating element with various bends along a length thereof. In some embodiments, the electrical heating element 226 may be defined with multiple electrical heating elements and be controlled with multiple knobs, for example. Regardless of the number of heating elements employed with the base 206, the base 206 may include electrical components and circuitry known to one of ordinary skill in the art for electrically heating the electrical heating element 226, to control a temperature of the electrical heating element 226 via the temperature control knob 224, and to visually display a desired temperature that may be manually set with the control knob and displayed on the display 230. Further, the electrical components may include one or more controllers cooperating with one or more sensors. The one or more sensors may be positioned within the cooking station 200 for sensing the actual temperature of the griddle 204 or electrical heating element 226 such that the one or more controllers may control the heating of the electrical heating element 226 based on the sensed actual temperature to then increase or decrease the temperature of the electrical heating element 226 to move toward the desired temperature, as known to one of ordinary skill in the art. Further, the base 206 of the cooking station 200 may be powered via an electrical cord (not shown) that may be plugged between an electrical socket 232 at, for example, the rear side surface 222 of the base 206 and a power source, such as an electrical plug outlet (not shown). The electrical components and circuitry associated with the base 206 of the cooking station 200 are known components to one of ordinary skill in the art of the cooking device industry.

As set forth, the griddle 204 may be removably coupled to the base 206 of the cooking station 200. For example, the upper side surface 212 of the base 206 may include front coupling structure 234 and rear coupling structure 236. Such front and rear coupling structure 234, 236 may be sized and configured to couple to corresponding front griddle feet structure 238 and rear griddle feet structure 240. The front griddle feet structure 238 may be positioned within or under a bracket 242 or like structure of the front coupling structure 234 such that, upon engaging the front griddle feet structure 238 with the front coupling structure 234, the griddle 204 may be maintained in its position so as to be prevented from upward movement. In this position, the rear griddle feet structure 240 may be positioned within the rear coupling structure 236 of the base 206, which may be the form of an opening or recess 244 to hold such rear griddle feet structure 240 therein. With this arrangement, the griddle 204 may be maintained to the base 206. If it is desired to remove the griddle 204 from the base 206, the rear griddle feet structure 240 may be lifted from the recesses 244 and then the griddle 204 may be moved laterally rearward to remove the front griddle feet structure 238 from the front coupling structure 234. In this manner, the griddle 204 may be removably coupled to the base 206 of the cooking station 200.

The griddle 204 of this embodiment may extend with a cooking surface 246 and an opposite underside 248. The cooking surface 246 may extend with a flat surface. The before-described front and rear griddle feet structure 238, 240 may extend from the underside 248 of the griddle 204. Along a periphery 250 of the cooking surface 246, the griddle 204 may include a splash guard 252 surrounding the cooking surface 246. Such splash guard 252 may extend to define front and rear splash guards 254, 256 and first and second splash guards 258, 260. The front and rear splash guards 254, 256 may be positioned along opposite sides of the griddle 204 such that the periphery 250 defining one end of the front and rear splash guards 254, 256 may extend parallel relative to each other. Similarly, the first and second splash guards 258, 260 may be positioned along opposite sides of the griddle 204 so as to extend parallel relative to each other and face each other. The griddle 204 may be positioned on the base 206 so that the front splash guard 254 extends adjacent to and along the front side panel 214 and the rear splash guard 256 extends adjacent to and along the rear side surface 222. The first and second splash guards 258, 260 may extend along, and correspond with, the respective first and second side surfaces 218, 220 of the base 206 and may each extend between the front and rear splash guards 254, 256. The splash guard 252 may extend to define a continuous top edge 262 that may extend along each of the respective front, rear, first and second splash guards 254, 256, 258, 260 so that the top edge 262 extends above the cooking surface 246. The griddle 204 may also include a sloped surface 264 that may be positioned adjacent the rear splash guard 256 that may slope toward a rear opening 266 defined at least partially in the rear splash guard 256. The rear opening 266 and sloped surface 264 of the griddle 204 may be sized and configured to facilitate draining grease from the griddle 204. Further, the sloped surface 264 may extend to define a trough 268. In this manner, such sloped surface 264 and trough 268 may further assist in effectively draining grease or other fluid from the cooking surface 246 so that fluid may move along the sloped surface 264 and through the rear opening 266 defined in the griddle 204. Further, along the rear side surface 222 of the base 206, a grease container 270 may be positioned so that grease may readily be drained through the rear opening 266 and into the grease container 270. Such grease container 270 may be positioned along the rear side surface 222 of the base 206 so that the grease container 270 may be latched to the base 206 so that a grease cup 272 of the grease container 270 is positioned under the rear opening 266. In another embodiment, the grease container 270 may be magnetically attached to the rear side surface 222 of the housing 210 and positioned under the rear opening 266 defined in the griddle 204.

Furthermore, with respect to FIGS. 12, 12A, 12B and 12C, in one embodiment, adjacent to the rear side surface 222 of the base 206, the rear splash guard 256 of the griddle 204 may include first and second griddle coupling structures 274, 276. Such first and second griddle coupling structure 274, 276 may be sized and configured to couple to the hood 202 so that the hood may pivot relative to the griddle 204 and the first and second griddle coupling structures 274, 276. The first and second griddle coupling structures 274, 276 may be positioned to extend away or outward from the rear splash guard 256. Each of the first and second griddle coupling structures 274, 276 may include an upward facing surface or rest surface 278. Further, each of the first and second griddle coupling structures 274, 276 may define a slot 280 therein, the slot 280 sized and configured to receive structure associated with the hood 202.

With reference to FIGS. 10 and 11, the hood 202 may include side walls 282 and an upper hood surface 284, the hood 202 sized and configured to surround a portion of the splash guard 252. For example, upon the hood 202 being in the closed position, the side walls 282 of the hood 202 may be sized and configured to extend over the top edge 262 of the splash guard 252 so as to extend downward beyond the top edge 262 and surround at least a portion of the height of the splash guard 252. The hood 202 may also include a handle 286 that facilitates readily pivoting the hood 202 between the open and closed positions, as depicted in respective FIGS. 11 and 12. Further, the hood 202 of this embodiment may include the upper hood surface 284 that, upon the hood 202 being in the closed position, the upper hood surface 284 extends over the cooking surface 246 of the griddle 204. In one embodiment, the upper hood surface 284 of the hood 202 may be formed of a transparent material, such as glass or a transparent polymeric material, so that, for example, the user of the cooking station 200 can have the hood 202 in the closed position while still viewing the food being cooked on the cooking surface 246.

Now with reference to FIGS. 10, 12, 12A, 12B and 12C, in one embodiment, one or more of the side walls 282 of the hood 202 may include first and second hinge structures 288, 290 sized and configured to couple to the first and second griddle coupling structures 274, 276, respectively, of the griddle 204. For example, the one or more side walls 282 may be a rear side wall 292 of the hood 202 such that the first and second hinge structures 288, 290 may be positioned to extend from a single side wall of the hood 202. In another embodiment, the first and second hinge structures 288, 290 may extend from respective first and second hood side walls 294, 296. The first and second hinge structures 288, 290 may each include a pin support 298 and a pin 300. The pin 300 may be held within the pin support 298 such that the pin support 298 may extend to define apertures sized to receive and hold opposing end portions of the pin 300. The pin 300 may be sized and configured to be positioned within an end 302 of the slot 280 defined in each of the first and second griddle coupling structures 274, 276. The pin 300 of each of the first and second hinge structures 288, 290 may be aligned so that elongate structure of the aligned pins 300 extends to define a pin axis 304. Such pin axis 304 may extend parallel with or co-axial to a pivot axis 306 of the hood 202. As such, upon the hood 202 being rotatably coupled to the griddle 204, the pin 300 of each of the first and second hinge structures 288, 290 may be positioned at the end 302 of the slot 280 defined in each of the first and second griddle coupling structures 274, 276 so that, as the hood 202 moves between the before described open and closed positions, the hood 202 may pivot about the pivot axis 306 as well as pivot or rotate about the pin axis 304, as shown by rotational arrow 308.

Figure 12B:
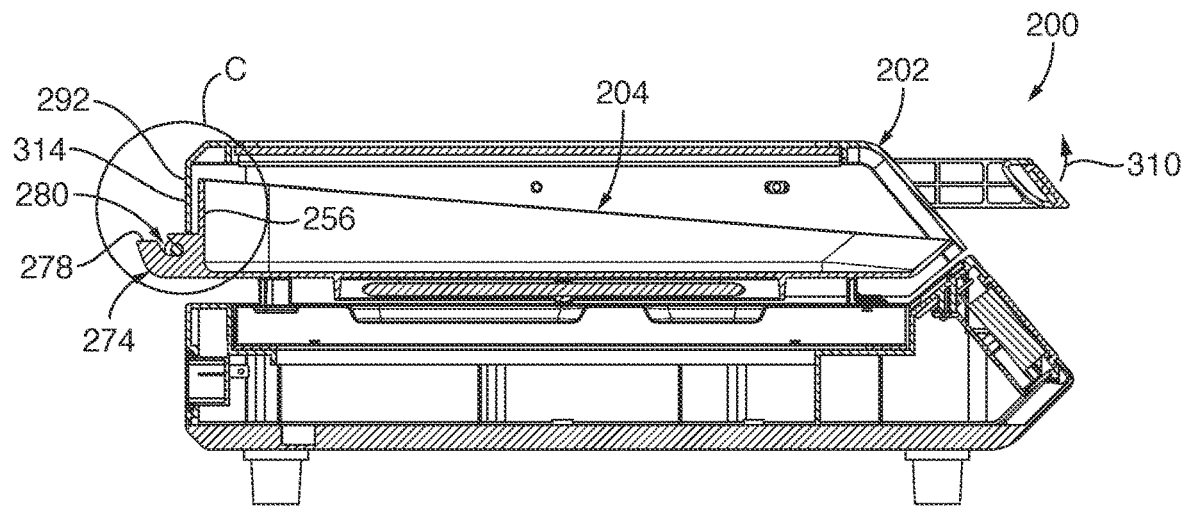
FIG. 12B is a cross-sectional view of the cooking station taken from section line B-B of FIG. 12, according to another embodiment of the present invention.
Figure 12C:
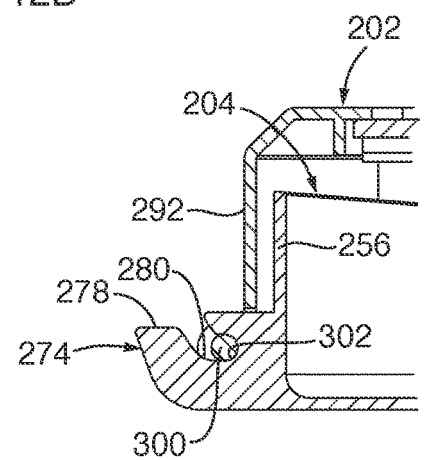
FIG. 12C is an enlarged view of the cooking station taken from region C of FIG. 12B, according to another embodiment of the present invention.

With reference to FIGS. 12B, 13, 13A and 13B, the hood 202 may move from the closed position to the open position, as shown by rotational arrow 310 in FIG. 12B. Similarly, the hood 202 may move from the open position to the closed position, as shown by rotational arrow 312, in FIG. 13A. Upon moving the hood 202 to the open position, an outward facing surface 314 of the rear side wall 292 of the hood 202 may be positioned directly against the upward facing surface or the rest surface 278 of the first and second griddle coupling structures 274, 276. In this manner, the hood 202 may be rotated to the open position so that the rear side wall 292 of the hood 202 rests on structure of the griddle 204, such as the first and second coupling structures 274, 276. As previously set forth, the hood 202 may be rotatably coupled to the griddle 204 so as to be moveable or pivotable between open and closed positions of the hood 202. As depicted, the hood 202 is moveable between the closed and open positions without interfering with the grease container 270. Further, with the hood 202 in the open position, the pin 300 may be positioned at the end 302 of the slot 280 such that the slot 280 may be oriented so that the hood 202 is not readily removed from the slot 280. In other words, the structure defining the slot 280 may extend with an orientation of the slot 280, shown as a slot profile in FIG. 13B. Such orientation of the slot 280 may be sized and configured so that, upon the hood 202 being in the open position, the hood 202 may be maintained or locked in its rotatable coupling arrangement with the griddle 204.

Figure 13:
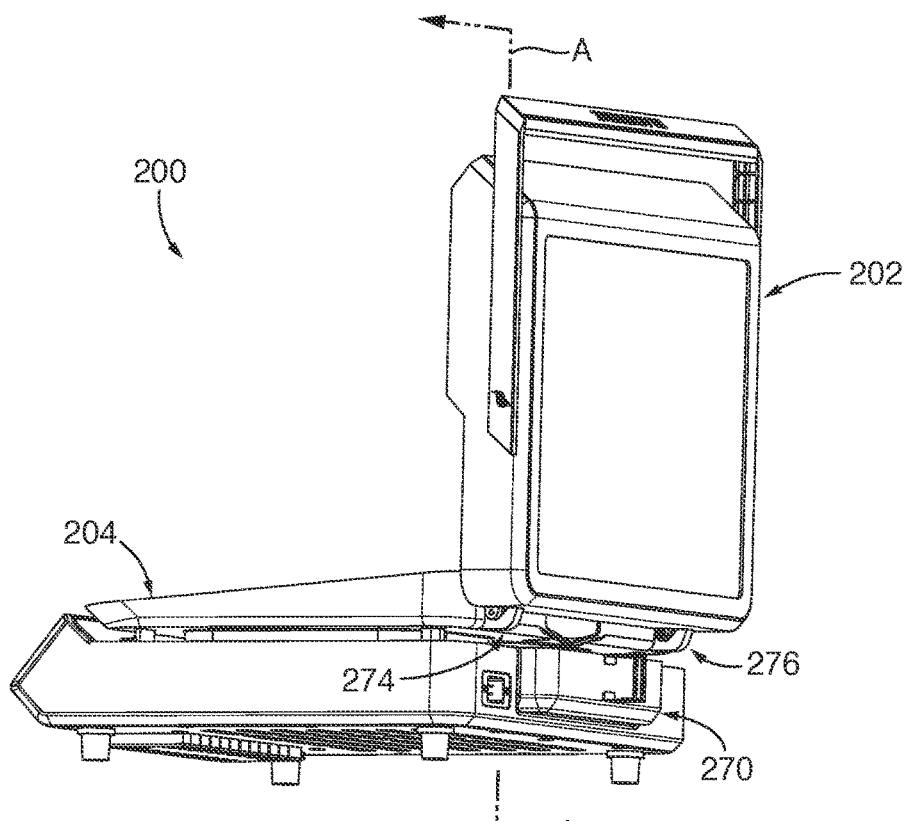
FIG. 13 is a perspective rear view of the cooking station, depicting the hood in the open position with the hood resting on an upward facing surface of first and second hinges, according to another embodiment of the present invention.
Figure 13A:
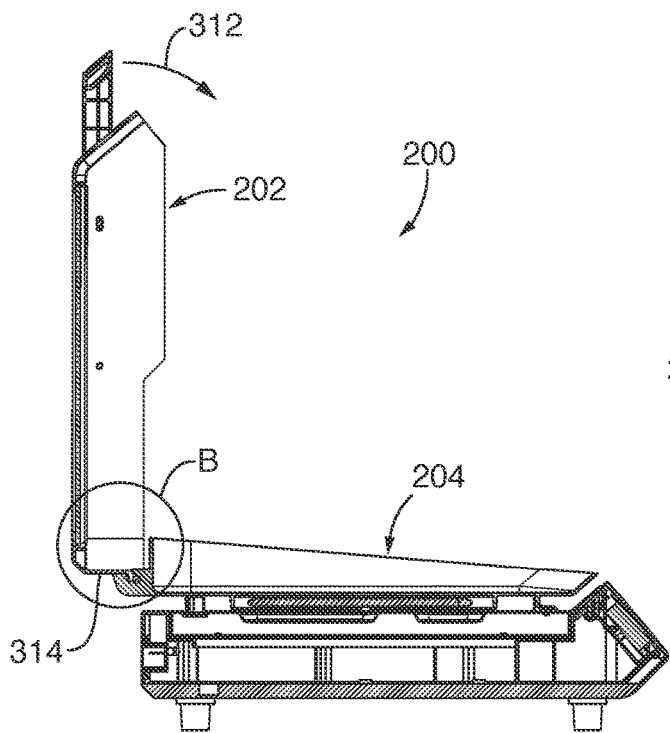
FIG. 13A is a cross-sectional view of the cooking station taken along section line A-A of FIG. 13, according to another embodiment of the present invention.
Figure 13B:
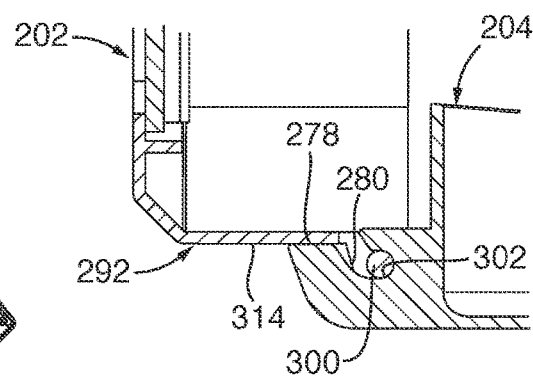
FIG. 13B is an enlarged view of the cooking station taken from region B of FIG. 13A, according to another embodiment of the present invention.
Figure 14:
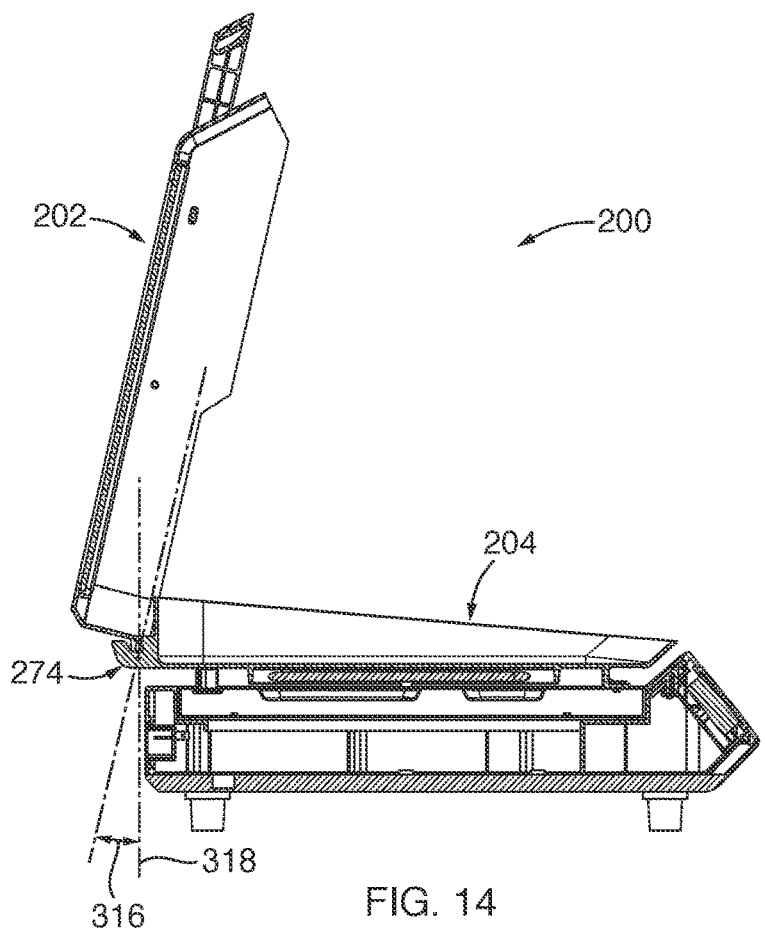
FIG. 14 is a cross-sectional view of the cooking station, depicting the hood in a tilted position, according to another embodiment of the present invention.
Figure 15:
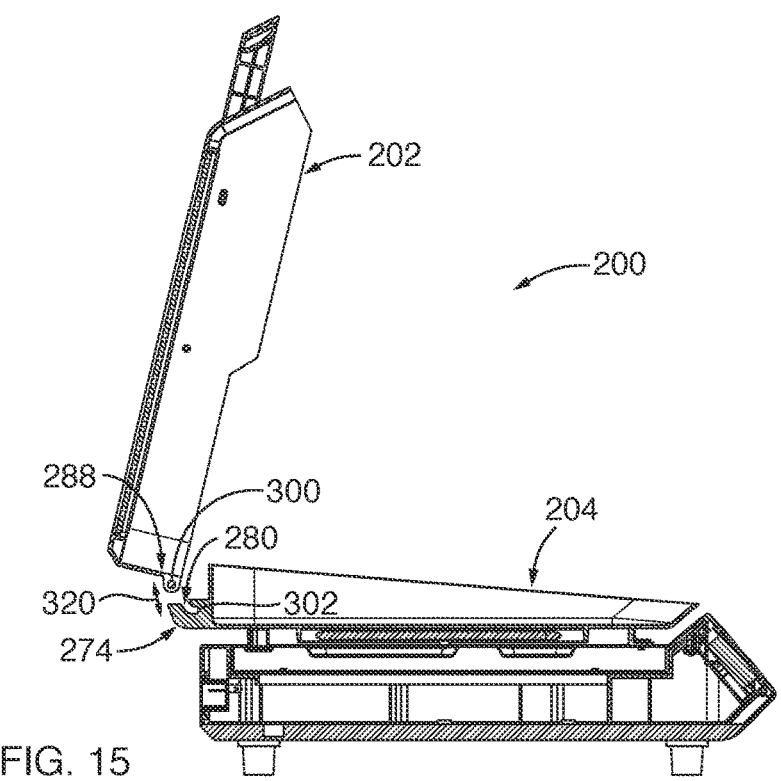
FIG. 15 is a cross-sectional view of the cooking station, depicting the hood removed from the griddle, according to another embodiment of the present invention.
Figure 16:
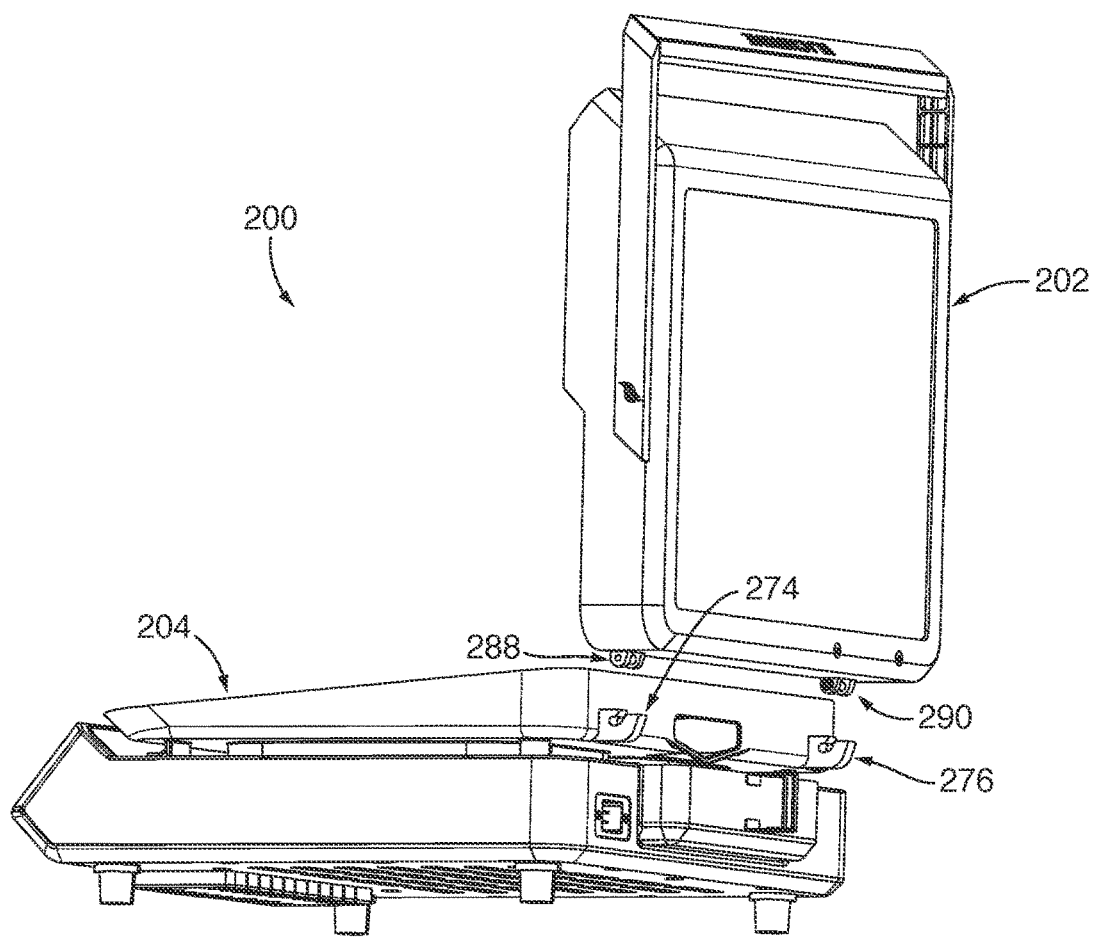
FIG. 16 is a perspective rear view of the hood removed from the cooking station, according to the present invention.
Figure 16A:
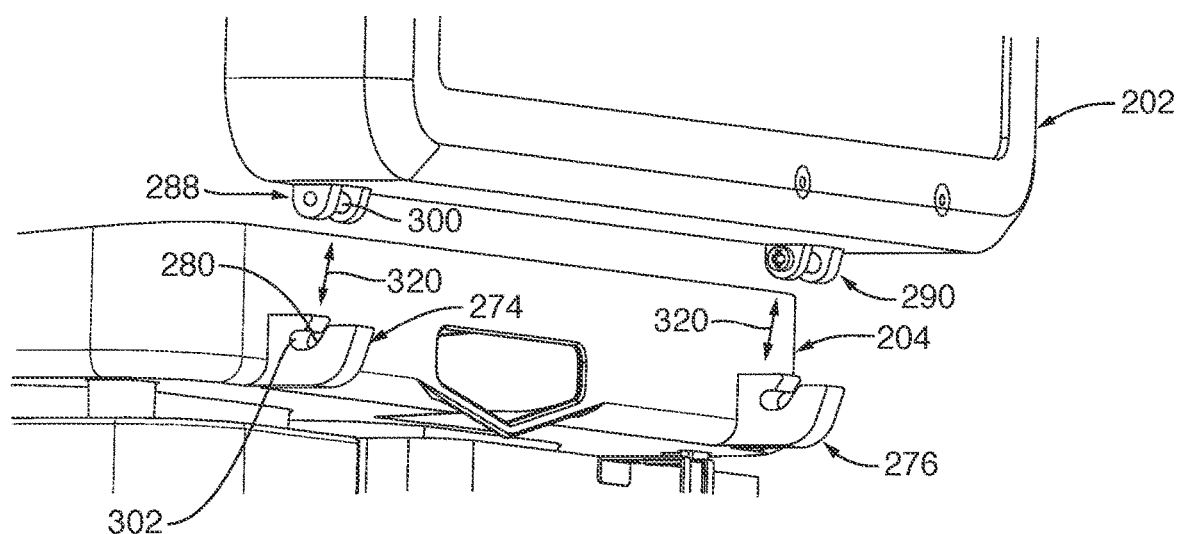
FIG. 16A is an enlarged view of the cooking station taken from region A of FIG. 16, according to another embodiment of the present invention.

Now with reference to FIGS. 13A and 14, the removal of the hood 202 from the griddle 204 and cooking station 200 will now be described. As previously set forth, the hood 202 may be readily removed from the griddle 204. Such removal of the hood 202 may be employed in a similar manner to that described in the previous embodiment relative to FIGS. 7 and 8. For example, upon the hood 202 being in the open position, as depicted in FIG. 13A, so as to define a vertical upright open position, the hood 202 may be pivoted about the pivot axis 306 (FIG. 12) so as to be pivoted forward to a tilted position to define an angle 316 relative to a vertical line 318 or the vertical upright open position, as depicted in FIG. 14.

With reference to FIGS. 14, 15, 16, and 16A, as previously set forth, the slot 280 defined in the first and second griddle coupling structures 274, 276 may be sized and configured with a particular orientation so that, upon moving the hood 202 to the tilted position, the hood 202 may be lifted out of the slots 280 defined in the griddle 204. More specifically, upon moving the hood 204 to the tilted position, the pin 300 for each of the first and second hinges 288, 290 may be slid out of the corresponding slots 280, as indicated by arrow 320 to, thereby, decouple the hood 202 from the griddle 204. In this manner, the hood 202 may be readily removed from the griddle 204 such that a user may simply rotate the hood 202 to the tilted position, and then remove the hood 202 from the griddle 204. The hood 202 may be readily re-attached to the griddle 204 in a similar manner by reversing the process. For example, the pin 300 of each of the first and second hinges 288, 290 may be positioned adjacent the respective slot 280 for the first and second griddle coupling structures 288, 290 to then slide the pin 300 to the end 302 of the corresponding slot 280, upon which, the hood 202 may be pivoted about the pivot axis 306 (FIG. 12) to the closed or open position. In this manner, the hood 202 may be readily removed and re-coupled relative to the griddle 204.

Now with reference to FIGS. 17-20, another embodiment of a cooking station 330 with a hood 332 removably coupled to a griddle 334. This embodiment is similar to the embodiment described and depicted in FIGS. 1-9, except for differences relative to the location of the hinge pins and notches/slots for coupling the hood 332 to the griddle 334. In this embodiment, similar to the previous embodiments set forth herein, the hood 332 is rotatably coupled to the griddle 334 of the cooking station 330 as well as romovably coupled to the griddle 334, and hung or suspended on the griddle 334 with tabs 335 or, otherwise referenced as hooks.

Figure 17:
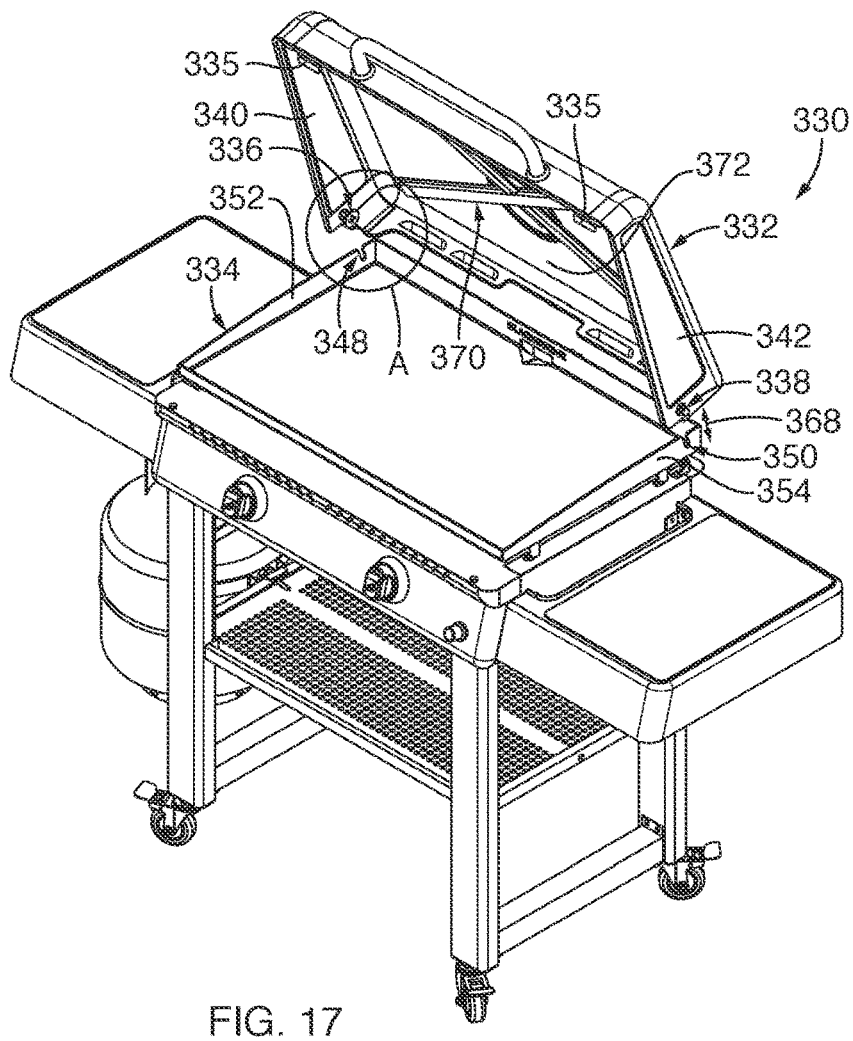
FIG. 17 is a perspective view of another embodiment of a cooking station with a hood configured to be removably coupled to a griddle, depicting the hood in a removed position relative to the griddle, according to the present invention.
Figure 17A:
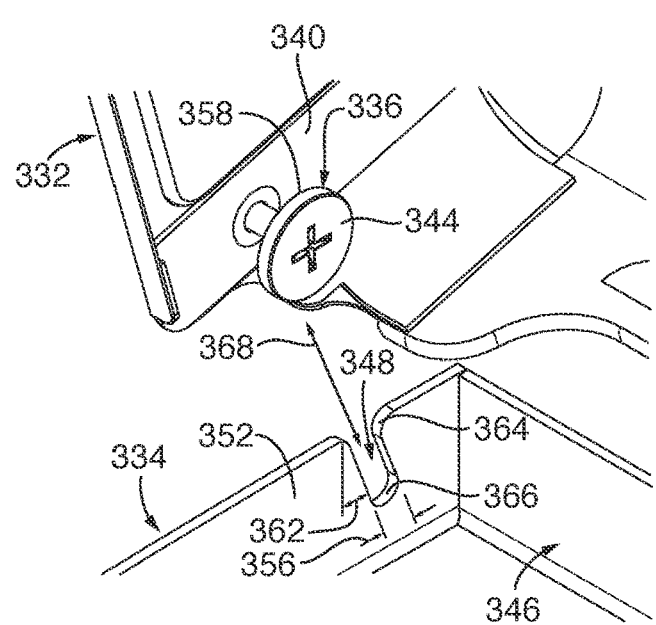
FIG. 17A is an enlarged view of the cooking station taken from region A of FIG. 17, depicting a pin coupled to the hood and a slot defined in the griddle, according to another embodiment of the present invention.
Figure 18:
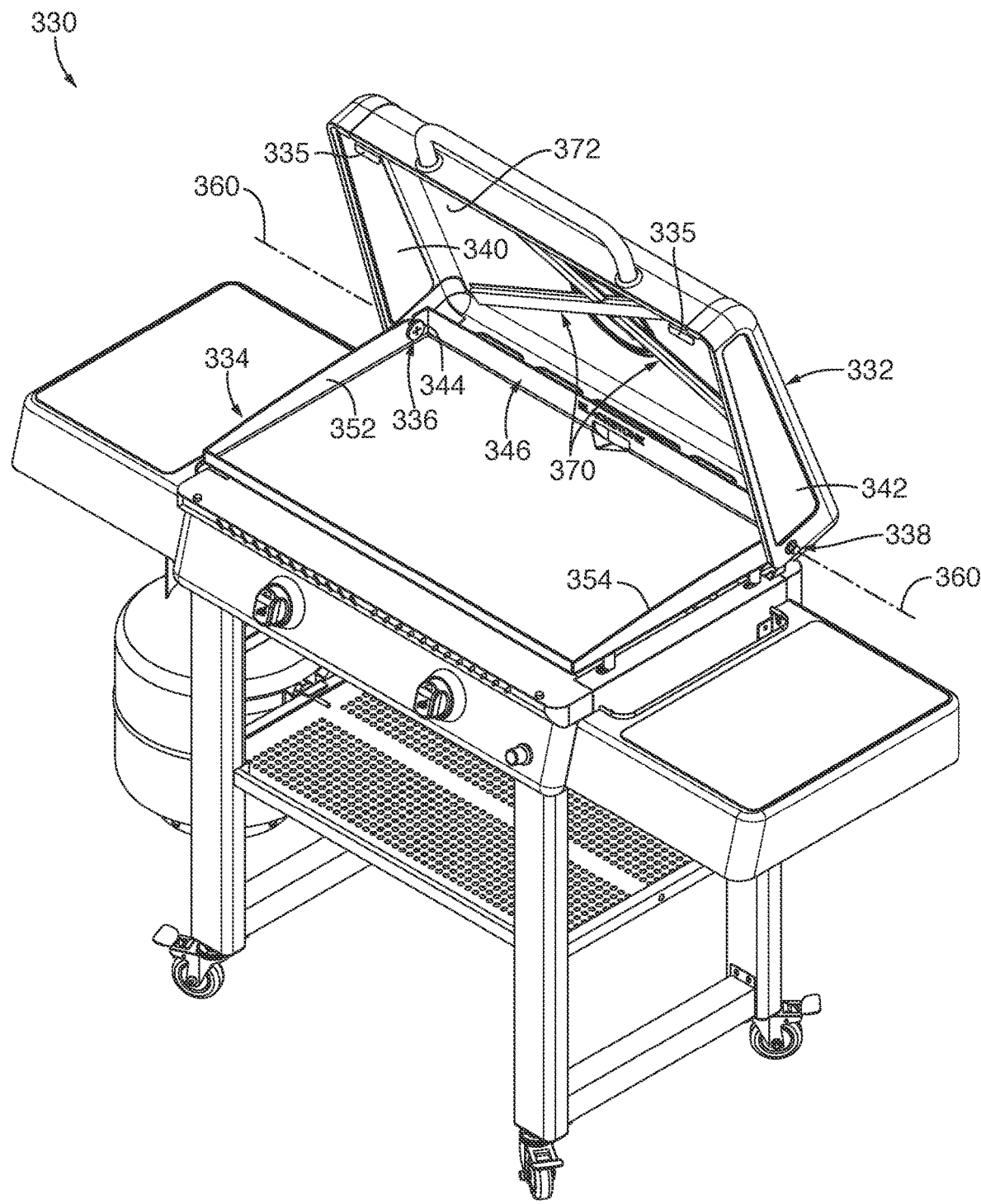
FIG. 18 is a perspective view of the cooking station of FIG. 17, depicting the hood rotatably coupled to the cooking station with the hood in an open position, according to another embodiment of the present invention.
Figure 19:
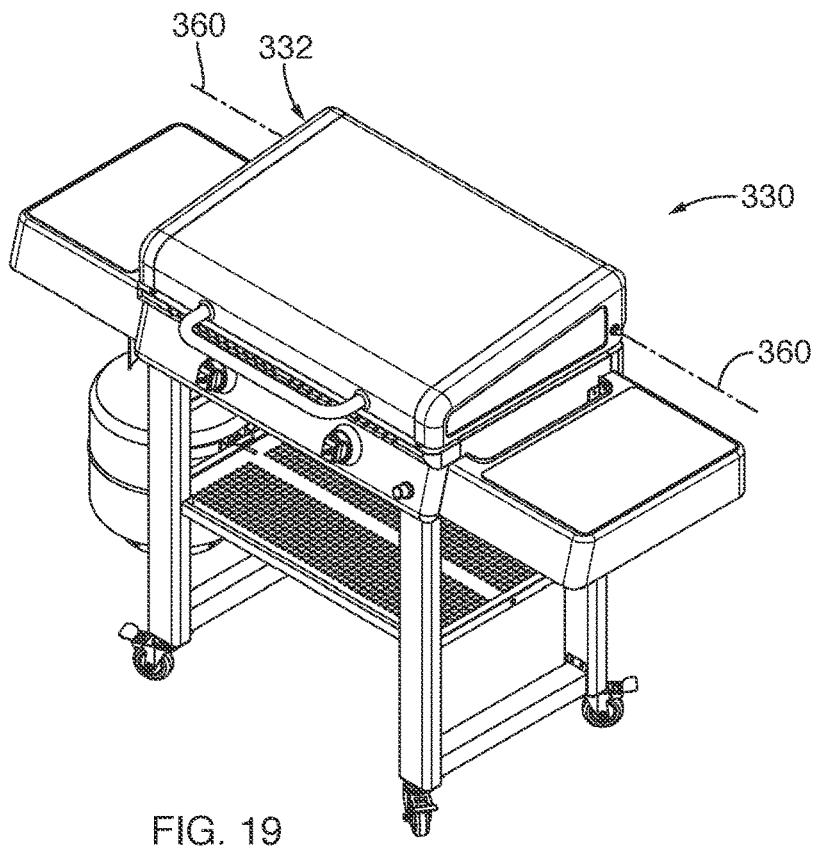
FIG. 19 is a perspective view of the cooking station of FIG. 17, depicting the hood in the closed position, according to another embodiment of the present invention.

With reference to FIGS. 17, 17A and 18, in this embodiment, the hood 332 includes a first pin 336 and a second pin 338 each fixedly coupled to a first side wall 340 and a second side wall 342, respectively, of the hood 332. Such first and second pins 336, 338 may act as hinge pins, similar to previous embodiments. The first and second pins 336, 338 may be positioned so as to be longitudinally aligned relative to each other. Further, each of the first and second pins 336, 338 may be positioned through an aperture defined in the respective first and second side walls 340, 342 of the hood 332 and may include a head 344 at one end of the first and second pins 336, 338.

The griddle 334 includes a splash guard 346 with notches or slots defined therein for receiving and cooperating with the first and second pins 336, 338. For example, the griddle 334 may include a first slot 348 defined in a first side splash guard 352 and a second slot 350 defined in a second side splash guard 354, the first and second slots 348, 350 sized and configured to receive the respective first and second pins 336, 338 for rotatably coupling the hood 332 to the griddle 334. The head 344 of each of the first and second pins 336, 338 may be sized larger than a gap 356 defining a lateral width dimension of the first and second slots 348, 350 so that an inner surface 358 of the head 344 may prevent substantial lateral movement of the hood 332 while allowing rotatable movement of the hood 332. With this arrangement, the first and second pins 336, 338 may be positioned within the respective first and second slots 348, 350 such that the hood 332 is rotatable about a pivot axis 360 defined along the first and second pins 336, 338, the pivot axis 360 extending along the longitudinal length and longitudinal axis of each of the first and second pins 336, 338 coupled to the hood 332. In this manner, the hood 332 may be rotated about the pivot axis 360 between a closed position (FIG. 19) and multiple oriented open positions (e.g., FIG. 18).

Figure 20:
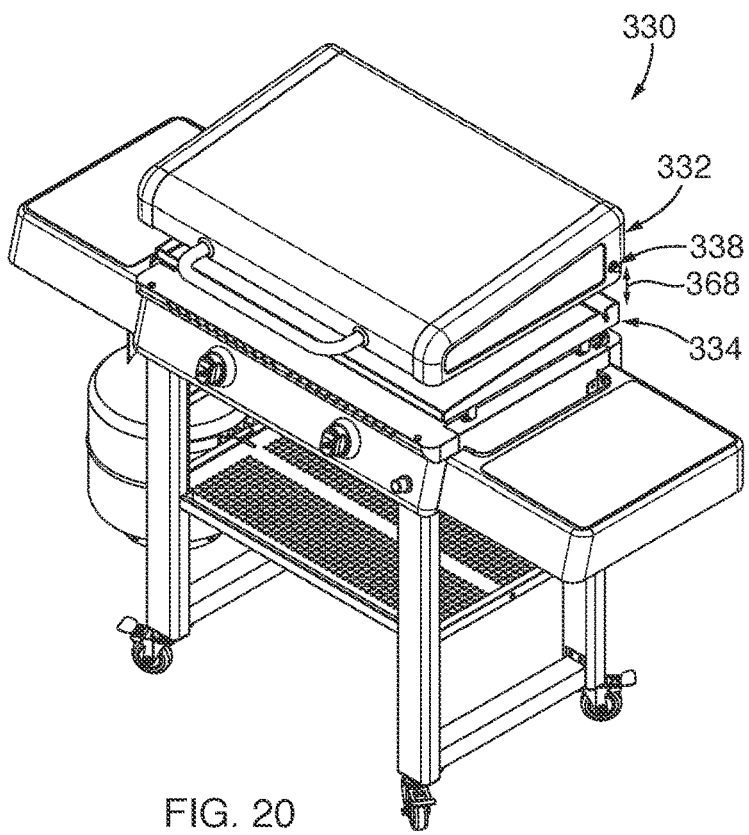
FIG. 20 is a perspective view of the cooking station, depicting the hood removed from the griddle with the hood in a horizontal position, according to another embodiment of the present invention.

Further, in this embodiment, the first and second slots 348, 350 defined in the griddle 334 may each extend with an elongated profile (without bends along the first and second slots). Such first and second slots 348, 350 may extend at an angle 362 (FIG. 17A) such that the elongated length of each of the first and second slots 348, 350 extend between a slot entrance 364 and a slot end 366. In one embodiment, such first and second slots 348, 350 may extend with a single angle between the slot entrance 364 and the slot end 366. Such single angle of the first and second slots 348, 350 may facilitate moving the hood 332 from being rotatably coupled to the griddle 334 via the first and second slots 348, 350 to a removed position (as depicted in FIGS. 17 and 20) such that the first and second pins 336, 338 of the hood 332 may be readily moved out of their respective slots when the hood is in a closed position, as shown by arrow 368 in FIGS. 17, 17A and 20, or any one of the tilted positions that the hood 332 may be positioned. In one embodiment, the fully open position of the hood 332 may not be readily removable from the griddle 334. In other words, the slot and pin arrangement of this embodiment is not limited to the hood 332 being in a single tilted position (or particular tilted position range) for removing the hood 332 from the griddle 334, as in previous embodiments, but rather, the first and second slots 348, 350 of this embodiment facilitate removal of the hood 332 from the griddle 334 from most any tilted position that the hood 332 may be oriented relative to the fully open position. The fully opened position of the hood 332 may be the position of the hood that is fully pivoted away from the griddle 334, to a hard stop, which may provide the hood 332 being oriented with a generally vertical orientation, similar to the embodiments described and depicted in FIGS. 2 and 13A. The tilted position of the hood 332 may be a position of the hood 332 that may be tilted forward from the fully open position, as depicted in FIG. 18 and similar to that depicted in FIGS. 7 and 14A. As such, the lack of a bend in the first and second slots 348, 350 may facilitate the hood 332 to be removable from the griddle 334 upon the hood 332 being in most any tilted position and the closed position of the hood (see FIGS. 19 and 20). With this arrangement, the hood 332 may be readily pivoted between closed and fully open positions relative to the griddle 334 and, if desired by the user, the hood 332 may be readily removed from the griddle 334 and set aside or hooked over a rear-side of the cooking station 330 or griddle 334.

In another embodiment, as depicted in FIGS. 17 and 18, the hood 332 may include a structural element 370 extending with an x-configuration along an underside surface 372 of the hood 332. Such structural element 370 may be in the form of multiple flat metal pieces, for example. The structural element 370 may be positioned directly to and along the underside surface 372 of the hood 332, similar to that depicted. The x-configuration or something similar to an x-configuration positioned and structurally secured to the underside surface 372 of the hood 332 may be sized and configured to act as a preventative to warping of the hood 332 due to the hood 332 undergoing extreme changes in temperature.

The griddle set forth in any one of the embodiments herein may be manufactured from metallic materials, such as, carbon steel, cast iron, stainless steel, or aluminum, or various metal alloys, or composite layering of materials, such as ceramic titanium coated material, or any other suitable cooking surface material known in the art, such as various porcelain coated materials. In one embodiment, the metallic materials may be manufactured using cold rolled steel processes, or hot rolled steel techniques, or any other known manufacturing process, such as casting or stamping, as known in the art. The various plate components of the griddle may include a thickness of 5-6 millimeters, but is not so limited, as such thickness of the various components of the griddle may range, for example, between 4-10 millimeters. Also, portions of the griddle, such as the trough and splash guards may be formed by employing cutting and bending techniques from sheet or plate material to form the griddle as well as forming portions to the griddle with welding techniques, or employing any other known process or techniques to form the griddle, as known by one of ordinary skill in the art.

The various structural components of the various embodiments of the cooking station and the hood and any other structural components thereof may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A cooking station, comprising:
a main body extending to define a front side, a rear side, a left side and a right side each extending between a lower end and an upper portion, the upper portion of the main body extending to support one or more heating elements therein;
a griddle configured to be supported by the upper portion of the main body, the griddle extending to define an upper side with a cooking surface and a splash guard, the splash guard extending upward from the cooking surface of the griddle to define a first side splash guard, a second side splash guard, and a rear splash guard such that ends of the rear splash guard connect with rear ends of the first and second side splash guards, the first and second side splash guards include respective first and second hinge pins extending therefrom, the first and second hinge pins aligned to define an axis; and
a hood sized and configured to be pivotably coupled to the splash guard so as to pivot about the axis between a closed position and a fully open position, the hood including a main hood wall, a first side hood wall, a second side hood wall, a rear side hood wall, and a front side hood wall, the main hood wall, upon the hood being in the closed position, extends to cover the griddle with the rear side hood wall and the front side hood wall extending downward relative to the main hood wall, and the first side hood wall and the second side hood wall each extending from opposite sides of the main hood wall so as to extend generally parallel relative to each other, the first side hood wall defining a first slot therein and the second side hood wall defining a second slot therein, the first and second slots sized and configured to correspond with the respective first and second hinge pins, the first and second slots of the hood configured to be positioned over the first and second hinge pins to facilitate the hood to be pivotably moveable between the closed position and the open position relative to the griddle such that, upon the hood being in the open position, the first and second slots defined in the hood facilitate the hood being manually moveable upward so that the first and second pins slide from the respective first and second slots so that the hood is removable from being pivotably coupled to the griddle, wherein, upon the hood being removed from the griddle, the hood is positionable to hang on the rear splash guard with a hook structure fixed to the front side hood wall of the hood so that the hood hangs along the rear side of the main body with the front side hood wall positioned along the rear splash guard of the griddle.

2. The cooking station of claim 1, wherein the hook structure extends from an underside surface of the hood.

3. The cooking station of claim 1, wherein the hook structure includes a first hook and a second hook, the first and second hooks being spaced from each other and extending from an underside surface of the hood.

4. The cooking station of claim 1, wherein the one or more heating elements comprise one or more gas burners.

5. A method for multi-positioning a hood of a cooking station, the method comprising:
providing a main body of the cooking station with a griddle positioned on an upper portion of the main body such that the griddle includes a splash guard extending upward from a cooking surface of the griddle, the splash guard extending to define a first side splash guard, a second side splash guard, and a rear splash guard such that ends of the rear splash guard connect with rear ends of the first and second side splash guards, the first and second side splash guards each defining a top edge and oppositely facing inner and outer surfaces, the first and second side splash guards including respective first and second elongated slots defined in the top edge and the inner and outer surfaces of the respective first and second side splash guards, the first and second elongated slots each extending into the top edge to extend downward and rearward at an acute angle relative to the cooking surface of the griddle;

pivoting the hood with first and second pins extending from respective first and second side hood walls of the hood such that the first and second pins are rotatable within the respective first and second elongated slots defined in the top edge and the inner and outer surfaces of the respective first and second side splash guards of the splash guard of the griddle so that the hood is moveable between a closed position and a fully open position so as to pivot the hood about an axis defined by the first and second pins;

positioning the hood to a tilted position, the tilted position set-back from the fully open position, such that the tilted position corresponds with the acute angle of each of the first and second elongated slots;

lifting the hood upward from the tilted position to remove the first and second pins of the hood from the respective first and second elongated slots of the griddle; and positioning the hood along a rear side of the main body.

6. The method according to claim 5, wherein the positioning the hood along the rear side of the main body comprises hanging the hood on the splash guard of the griddle with a hook structure.

7. The method according to claim 5, wherein the positioning the hood along the rear side comprises positioning the hood in a low-profile position with a hook structure extending from a front hood wall of the hood such that the hook structure engages the splash guard of the griddle.

8. A cooking station, comprising:
a main body extending to define a front side, a rear side, a left side and a right side each extending between a lower end and an upper portion, the upper portion of the main body including a heating element;
a griddle configured to be supported by the main body and removably coupled to the main body, the griddle extending to define an upper side with a cooking surface and a splash guard, the splash guard extending upward from the cooking surface of the griddle to define a first side splash guard, a second side splash guard, and a rear splash guard such that ends of the rear splash guard connect with rear ends of the first and second side splash guards, the first and second side splash guards each extending to define a top edge, an inner surface and an outer surface, the inner surface facing opposite of the outer surface, the first side splash guard defining a first elongated slot extending into the top edge and into both the inner and outer surfaces of the first side splash guard, the second side splash guard defining a second elongated slot extending into the top edge and into both the inner and outer surfaces of the second side splash guard; and
a hood sized and configured to cover the griddle, the hood having a first hinge pin and a second hinge pin, the first hinge pin aligned with the second hinge pin to define an axis, the first and second hinge pins sized and configured to be positioned within the respective first and second elongated slots defined in the respective first and second side splash guards of the griddle so that the hood is pivotably coupled to the griddle and the hood is pivotably moveable between a closed position and a fully open position relative to the griddle, wherein, upon the hood being pivoted to a tilted position, the tilted position being set-back from the fully open position, the hood is removable from the griddle.

9. The cooking station of claim 8, wherein the heating element comprises an electrical resistive heating element.

10. The cooking station of claim 8, wherein the heating element comprises one or more gas burners.

11. The cooking station of claim 8, wherein the hood is hangable over the griddle upon the first and second hinge pins disengaging from the respective first and second elongated slots of the griddle.

12. The cooking station of claim 8, wherein the first and second elongated slots each extending into the top edge of the respective first and second side splash guards so as to extend downward and rearward at an acute angle relative to the cooking surface of the griddle.

13. The cooking station of claim 12, wherein, upon the hood being positioned in the tilted position, the tilted position corresponds with the acute angle of the first and second elongated slots.

14. The cooking station of claim 8, wherein the hood comprises a hood main wall with a front hood wall, a rear hood wall, a first side hood wall and a second side hood wall; wherein, upon the hood being in a closed position over the griddle, each of the front hood wall, the rear hood wall, the first side hood wall, and the second side hood wall extend downward from the main hood wall so as to surround the griddle.

15. The cooking station of claim 14, wherein the front hood wall of the hood comprises a hook structure fixed thereto, the hook structure sized and configured to facilitate hanging the hood.

16. The cooking station of claim 8, wherein the hood comprises a hook structure fixed thereto, the hook structure sized and configured to facilitate hanging the hood.

17. The cooking station of claim 1, wherein the first and second slots are each elongated and positioned in the respective first and second side hood walls and adjacent the rear side hood wall.

18. The cooking station of claim 17, wherein, upon the hood being in the closed position, the first and second slots extend in the respective first and second side hood walls upward and forward toward the front side of the main body to extend at an acute angle relative to the cooking surface of the griddle.

19. The cooking station of claim 18, wherein, upon the hood being in an open position that corresponds with the acute angle of the first and second slots, the hood is removable from the griddle.

20. The method according to claim 5, further comprising replacing the hood to be pivotably coupled to the griddle by lifting the hood above the griddle so that the first and second pins of the hood are positioned adjacent the respective first and second elongated slots of the griddle, and lowering the first and second pins into the respective first and second elongated slots of the griddle.

* * * * *